US012572800B2

(12) United States Patent　　　　(10) Patent No.:　US 12,572,800 B2
Brady et al.　　　　　　　　　　　　(45) Date of Patent:　　Mar. 10, 2026

(54) TRANSPOSING MEMORY LAYOUT OF WEIGHTS IN DEEP NEURAL NETWORKS (DNNs)

(71) Applicant: Intel Corporation, Santa Clara, CA (US)

(72) Inventors: Kevin Brady, Newry (GB); Sudheendra Kadri, Folsom, CA (US); Niall Hanrahan, Galway (IE)

(73) Assignee: Intel Corporation, Santa Clara, CA (US)

( * ) Notice: Subject to any disclaimer, the term of this patent is extended or adjusted under 35 U.S.C. 154(b) by 646 days.

(21) Appl. No.: 17/937,592

(22) Filed: Oct. 3, 2022

(65) Prior Publication Data

US 2023/0229910 A1　　Jul. 20, 2023

(51) Int. Cl.
*G06N 3/08*　　　　(2023.01)
*G06F 13/28*　　　(2006.01)
*G06N 3/048*　　　(2023.01)

(52) U.S. Cl.
CPC .............. *G06N 3/08* (2013.01); *G06F 13/28* (2013.01); *G06N 3/048* (2023.01); *G06F 2213/28* (2013.01)

(58) Field of Classification Search
CPC ........ G06N 3/08; G06N 3/0481; G06F 13/28; G06F 2213/28

USPC ........................................................... 709/22
See application file for complete search history.

(56) References Cited

U.S. PATENT DOCUMENTS

| | | | | |
|---|---|---|---|---|
| 11,216,732 B2 * | 1/2022 | Zlateski | ................. | G06N 3/082 |
| 12,040,821 B2 * | 7/2024 | Brothers, III | ......... | G06F 7/5443 |
| 2023/0014656 A1 * | 1/2023 | Sung | ........................ | G06N 3/04 |
| 2023/0259467 A1 * | 8/2023 | Deidda | ................. | G06F 3/0611 |
| | | | | 710/22 |
| 2023/0334006 A1 * | 10/2023 | Sumbul | ............... | G06F 15/8046 |

* cited by examiner

*Primary Examiner* — Andrew Joseph Rudy
(74) *Attorney, Agent, or Firm* — Akona IP PC

(57)　　　　ABSTRACT

A compute block includes a DMA engine that reads data from an external memory and write the data into a local memory of the compute block. An MAC array in the compute block may use the data to perform convolutions. The external memory may store weights of one or more filters in a memory layout that comprises a sequence of sections for each filter. Each section may correspond to a channel of the filter and may store all the weights in the channel. The DMA engine may convert the memory layout to a different memory layout, which includes a sequence of new sections for each filter. Each new section may include a weight vector that includes a sequence of weights, each of which is from a different channel. The DMA engine may also compress the weights, e.g., by removing zero valued weights, before the conversion of the memory layout.

25 Claims, 14 Drawing Sheets

DNN
100

Object
115

Object
125

Object
135

Input Image
105

140    150    160

163

183    193

180    190

Convolutional Layer 110

Pooling Layer 120

Fully Connected Layer
130

| Address Offset (Bytes) | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| 0x000 | 0,4,3 | 0,3,3 | 0,2,3 | 0,1,3 | 0,0,3 | 0,8,2 | 0,7,2 | 0,6,2 | 0,5,2 | 0,4,2 | 0,3,2 | 0,2,2 | 0,1,2 | 0,0,1 | 0,8,1 | 0,7,1 | 0,6,1 | 0,5,1 | 0,4,1 | 0,3,1 | 0,2,1 | 0,1,1 | 0,0,0 | 0,8,0 | 0,7,0 | 0,6,0 | 0,5,0 | 0,4,0 | 0,3,0 | 0,2,0 | 0,1,0 | 0,0,0 |
| 0x020 | 0,0,7 | 0,8,6 | 0,7,6 | 0,6,6 | 0,5,6 | 0,4,6 | 0,3,6 | 0,2,6 | 0,1,6 | 0,0,5 | 0,8,5 | 0,7,5 | 0,6,5 | 0,5,5 | 0,4,5 | 0,3,5 | 0,2,5 | 0,1,5 | 0,0,4 | 0,8,4 | 0,7,4 | 0,6,4 | 0,5,4 | 0,4,4 | 0,3,4 | 0,2,4 | 0,1,4 | 0,0,3 | 0,8,3 | 0,7,3 | 0,6,3 | 0,5,3 |
| 0x040 | 0,5,10 | 0,4,10 | 0,3,10 | 0,2,10 | 0,1,10 | 0,0,10 | 0,8,9 | 0,7,9 | 0,6,9 | 0,5,9 | 0,4,9 | 0,3,9 | 0,2,9 | 0,1,9 | 0,0,9 | 0,8,8 | 0,7,8 | 0,6,8 | 0,5,8 | 0,4,8 | 0,3,8 | 0,2,8 | 0,1,8 | 0,0,8 | 0,8,7 | 0,7,7 | 0,6,7 | 0,5,7 | 0,4,7 | 0,3,7 | 0,2,7 | 0,1,7 |
| 0x080 | 0,1,14 | 0,0,14 | 0,8,13 | 0,7,13 | 0,6,13 | 0,5,13 | 0,4,13 | 0,3,13 | 0,2,13 | 0,1,13 | 0,0,13 | 0,8,12 | 0,7,12 | 0,6,12 | 0,5,12 | 0,4,12 | 0,3,12 | 0,2,12 | 0,1,12 | 0,0,12 | 0,8,11 | 0,7,11 | 0,6,11 | 0,5,11 | 0,4,11 | 0,3,11 | 0,2,11 | 0,1,11 | 0,0,11 | 0,8,10 | 0,7,10 | 0,6,10 |
| 0x0A0 | 0,6,17 | 0,5,17 | 0,4,17 | 0,3,17 | 0,2,17 | 0,1,17 | 0,0,17 | 0,8,16 | 0,7,16 | 0,6,16 | 0,5,16 | 0,4,16 | 0,3,16 | 0,2,16 | 0,1,16 | 0,0,16 | 0,8,15 | 0,7,15 | 0,6,15 | 0,5,15 | 0,4,15 | 0,3,15 | 0,2,15 | 0,1,15 | 0,0,15 | 0,8,14 | 0,7,14 | 0,6,14 | 0,5,14 | 0,4,14 | 0,3,14 | 0,2,14 |
| 0x0C0 | 0,2,21 | 0,1,21 | 0,0,21 | 0,8,20 | 0,7,20 | 0,6,20 | 0,5,20 | 0,4,20 | 0,3,20 | 0,2,20 | 0,1,20 | 0,0,20 | 0,8,19 | 0,7,19 | 0,6,19 | 0,5,19 | 0,4,19 | 0,3,19 | 0,2,19 | 0,1,19 | 0,0,19 | 0,8,18 | 0,7,18 | 0,6,18 | 0,5,18 | 0,4,18 | 0,3,18 | 0,2,18 | 0,1,18 | 0,0,18 | 0,8,17 | 0,7,17 |
| 0x0E0 | 0,7,24 | 0,6,24 | 0,5,24 | 0,4,24 | 0,3,24 | 0,2,24 | 0,1,24 | 0,0,24 | 0,8,23 | 0,7,23 | 0,6,23 | 0,5,23 | 0,4,23 | 0,3,23 | 0,2,23 | 0,1,23 | 0,0,23 | 0,8,22 | 0,7,22 | 0,6,22 | 0,5,22 | 0,4,22 | 0,3,22 | 0,2,22 | 0,1,22 | 0,0,22 | 0,8,21 | 0,7,21 | 0,6,21 | 0,5,21 | 0,4,21 | 0,3,21 |
| 0x100 | 0,3,28 | 0,2,28 | 0,1,28 | 0,0,28 | 0,8,27 | 0,7,27 | 0,6,27 | 0,5,27 | 0,4,27 | 0,3,27 | 0,2,27 | 0,1,27 | 0,0,27 | 0,8,26 | 0,7,26 | 0,6,26 | 0,5,26 | 0,4,26 | 0,3,26 | 0,2,26 | 0,1,26 | 0,0,26 | 0,8,25 | 0,7,25 | 0,6,25 | 0,5,25 | 0,4,25 | 0,3,25 | 0,2,25 | 0,1,25 | 0,0,25 | 0,8,24 |
| 0x120 | 0,8,31 | 0,7,31 | 0,6,31 | 0,5,31 | 0,4,31 | 0,3,31 | 0,2,31 | 0,1,31 | 0,0,31 | 0,8,30 | 0,7,30 | 0,6,30 | 0,5,30 | 0,4,30 | 0,3,30 | 0,2,30 | 0,1,30 | 0,0,30 | 0,8,29 | 0,7,29 | 0,6,29 | 0,5,29 | 0,4,29 | 0,3,29 | 0,2,29 | 0,1,29 | 0,0,29 | 0,8,28 | 0,7,28 | 0,6,28 | 0,5,28 | 0,4,28 |

FIG. 4

| Address Offset (Bytes) | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| 0x000 | 0,0, 31 | 0,0, 30 | 0,0, 29 | 0,0, 28 | 0,0, 27 | 0,0, 26 | 0,0, 25 | 0,0, 24 | 0,0, 23 | 0,0, 22 | 0,0, 21 | 0,0, 20 | 0,0, 19 | 0,0, 18 | 0,0, 17 | 0,0, 16 | 0,0, 15 | 0,0, 14 | 0,0, 13 | 0,0, 12 | 0,0, 11 | 0,0, 10 | 0,0, 9 | 0,0, 8 | 0,0, 7 | 0,0, 6 | 0,0, 5 | 0,0, 4 | 0,0, 3 | 0,0, 2 | 0,0, 1 | 0,0, 0 |
| 0x020 | 0,1, 31 | 0,1, 30 | 0,1, 29 | 0,1, 28 | 0,1, 27 | 0,1, 26 | 0,1, 25 | 0,1, 24 | 0,1, 23 | 0,1, 22 | 0,1, 21 | 0,1, 20 | 0,1, 19 | 0,1, 18 | 0,1, 17 | 0,1, 16 | 0,1, 15 | 0,1, 14 | 0,1, 13 | 0,1, 12 | 0,1, 11 | 0,1, 10 | 0,1, 9 | 0,1, 8 | 0,1, 7 | 0,1, 6 | 0,1, 5 | 0,1, 4 | 0,1, 3 | 0,1, 2 | 0,1, 1 | 0,1, 0 |
| 0x040 | 0,2, 31 | 0,2, 30 | 0,2, 29 | 0,2, 28 | 0,2, 27 | 0,2, 26 | 0,2, 25 | 0,2, 24 | 0,2, 23 | 0,2, 22 | 0,2, 21 | 0,2, 20 | 0,2, 19 | 0,2, 18 | 0,2, 17 | 0,2, 16 | 0,2, 15 | 0,2, 14 | 0,2, 13 | 0,2, 12 | 0,2, 11 | 0,2, 10 | 0,2, 9 | 0,2, 8 | 0,2, 7 | 0,2, 6 | 0,2, 5 | 0,2, 4 | 0,2, 3 | 0,2, 2 | 0,2, 1 | 0,2, 0 |
| 0x080 | 0,3, 31 | 0,3, 30 | 0,3, 29 | 0,3, 28 | 0,3, 27 | 0,3, 26 | 0,3, 25 | 0,3, 24 | 0,3, 23 | 0,3, 22 | 0,3, 21 | 0,3, 20 | 0,3, 19 | 0,3, 18 | 0,3, 17 | 0,3, 16 | 0,3, 15 | 0,3, 14 | 0,3, 13 | 0,3, 12 | 0,3, 11 | 0,3, 10 | 0,3, 9 | 0,3, 8 | 0,3, 7 | 0,3, 6 | 0,3, 5 | 0,3, 4 | 0,3, 3 | 0,3, 2 | 0,3, 1 | 0,3, 0 |
| 0x0A0 | 0,4, 31 | 0,4, 30 | 0,4, 29 | 0,4, 28 | 0,4, 27 | 0,4, 26 | 0,4, 25 | 0,4, 24 | 0,4, 23 | 0,4, 22 | 0,4, 21 | 0,4, 20 | 0,4, 19 | 0,4, 18 | 0,4, 17 | 0,4, 16 | 0,4, 15 | 0,4, 14 | 0,4, 13 | 0,4, 12 | 0,4, 11 | 0,4, 10 | 0,4, 9 | 0,4, 8 | 0,4, 7 | 0,4, 6 | 0,4, 5 | 0,4, 4 | 0,4, 3 | 0,4, 2 | 0,4, 1 | 0,4, 0 |
| 0x0C0 | 0,5, 31 | 0,5, 30 | 0,5, 29 | 0,5, 28 | 0,5, 27 | 0,5, 26 | 0,5, 25 | 0,5, 24 | 0,5, 23 | 0,5, 22 | 0,5, 21 | 0,5, 20 | 0,5, 19 | 0,5, 18 | 0,5, 17 | 0,5, 16 | 0,5, 15 | 0,5, 14 | 0,5, 13 | 0,5, 12 | 0,5, 11 | 0,5, 10 | 0,5, 9 | 0,5, 8 | 0,5, 7 | 0,5, 6 | 0,5, 5 | 0,5, 4 | 0,5, 3 | 0,5, 2 | 0,5, 1 | 0,5, 0 |
| 0x0E0 | 0,6, 31 | 0,6, 30 | 0,6, 29 | 0,6, 28 | 0,6, 27 | 0,6, 26 | 0,6, 25 | 0,6, 24 | 0,6, 23 | 0,6, 22 | 0,6, 21 | 0,6, 20 | 0,6, 19 | 0,6, 18 | 0,6, 17 | 0,6, 16 | 0,6, 15 | 0,6, 14 | 0,6, 13 | 0,6, 12 | 0,6, 11 | 0,6, 10 | 0,6, 9 | 0,6, 8 | 0,6, 7 | 0,6, 6 | 0,6, 5 | 0,6, 4 | 0,6, 3 | 0,6, 2 | 0,6, 1 | 0,6, 0 |
| 0x100 | 0,7, 31 | 0,7, 30 | 0,7, 29 | 0,7, 28 | 0,7, 27 | 0,7, 26 | 0,7, 25 | 0,7, 24 | 0,7, 23 | 0,7, 22 | 0,7, 21 | 0,7, 20 | 0,7, 19 | 0,7, 18 | 0,7, 17 | 0,7, 16 | 0,7, 15 | 0,7, 14 | 0,7, 13 | 0,7, 12 | 0,7, 11 | 0,7, 10 | 0,7, 9 | 0,7, 8 | 0,7, 7 | 0,7, 6 | 0,7, 5 | 0,7, 4 | 0,7, 3 | 0,7, 2 | 0,7, 1 | 0,7, 0 |
| 0x120 | 0,8, 31 | 0,8, 30 | 0,8, 29 | 0,8, 28 | 0,8, 27 | 0,8, 26 | 0,8, 25 | 0,8, 24 | 0,8, 23 | 0,8, 22 | 0,8, 21 | 0,8, 20 | 0,8, 19 | 0,8, 18 | 0,8, 17 | 0,8, 16 | 0,8, 15 | 0,8, 14 | 0,8, 13 | 0,8, 12 | 0,8, 11 | 0,8, 10 | 0,8, 9 | 0,8, 8 | 0,8, 7 | 0,8, 6 | 0,8, 5 | 0,8, 4 | 0,8, 3 | 0,8, 2 | 0,8, 1 | 0,8, 0 |

FIG. 5

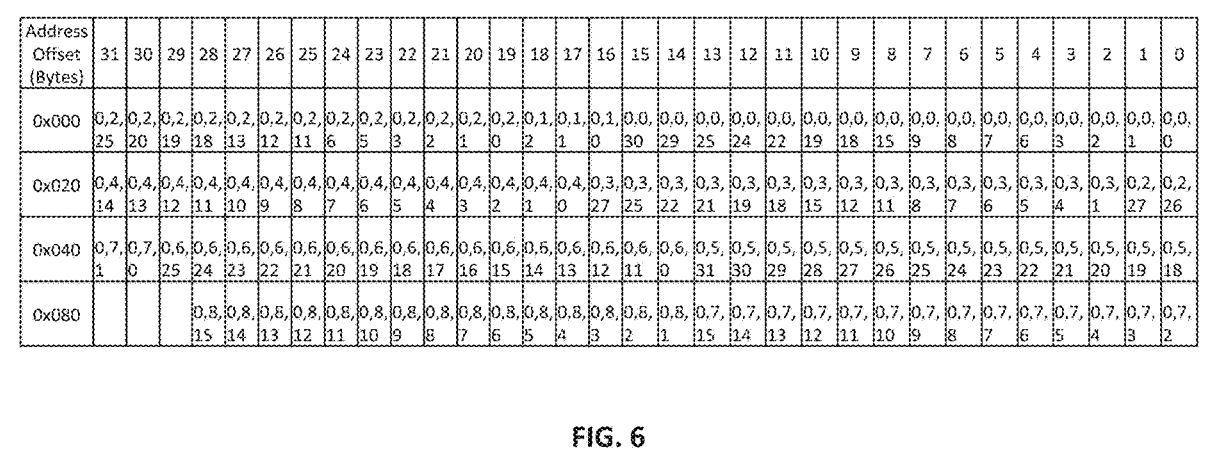

| Address Offset (Bytes) | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| 0x000 | 0,2,25 | 0,2,20 | 0,2,19 | 0,2,18 | 0,2,13 | 0,2,12 | 0,2,11 | 0,2,6 | 0,2,5 | 0,2,3 | 0,2,2 | 0,2,1 | 0,2,0 | 0,1,2 | 0,1,1 | 0,1,0 | 0,0,30 | 0,0,29 | 0,0,25 | 0,0,24 | 0,0,22 | 0,0,19 | 0,0,18 | 0,0,15 | 0,0,9 | 0,0,8 | 0,0,7 | 0,0,6 | 0,0,3 | 0,0,2 | 0,0,1 | 0,0,0 |
| 0x020 | 0,4,14 | 0,4,13 | 0,4,12 | 0,4,11 | 0,4,10 | 0,4,9 | 0,4,8 | 0,4,7 | 0,4,6 | 0,4,5 | 0,4,4 | 0,4,3 | 0,4,2 | 0,4,1 | 0,4,0 | 0,3,27 | 0,3,25 | 0,3,22 | 0,3,21 | 0,3,19 | 0,3,18 | 0,3,15 | 0,3,12 | 0,3,11 | 0,3,8 | 0,3,7 | 0,3,6 | 0,3,5 | 0,3,4 | 0,3,1 | 0,2,27 | 0,2,26 |
| 0x040 | 0,7,1 | 0,7,0 | 0,6,25 | 0,6,24 | 0,6,23 | 0,6,22 | 0,6,21 | 0,6,20 | 0,6,19 | 0,6,18 | 0,6,17 | 0,6,16 | 0,6,15 | 0,6,14 | 0,6,13 | 0,6,12 | 0,6,11 | 0,6,0 | 0,5,31 | 0,5,30 | 0,5,29 | 0,5,28 | 0,5,27 | 0,5,26 | 0,5,25 | 0,5,24 | 0,5,23 | 0,5,22 | 0,5,21 | 0,5,20 | 0,5,19 | 0,5,18 |
| 0x080 |  |  |  | 0,8,15 | 0,8,14 | 0,8,13 | 0,8,12 | 0,8,11 | 0,8,10 | 0,8,9 | 0,8,8 | 0,8,7 | 0,8,6 | 0,8,5 | 0,8,4 | 0,8,3 | 0,8,2 | 0,8,1 | 0,7,15 | 0,7,14 | 0,7,13 | 0,7,12 | 0,7,11 | 0,7,10 | 0,7,9 | 0,7,8 | 0,7,7 | 0,7,6 | 0,7,5 | 0,7,4 | 0,7,3 | 0,7,2 |

FIG. 6

| Address Offset (Bytes) | 31 | ... | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|
| 0x000 | | | | 0,0,30 | 0,0,29 | 0,0,25 | 0,0,24 | 0,0,22 | 0,0,19 | 0,0,18 | 0,0,15 | 0,0,9 | 0,0,8 | 0,0,7 | 0,0,6 | 0,0,3 | 0,0,2 | 0,0,1 | 0,0,0 |
| 0x020 | | | | | | | | | | | | | | | | | 0,1,2 | 0,1,1 | 0,1,0 |
| 0x040 | | | | | 0,2,27 | 0,2,26 | 0,2,25 | 0,2,20 | 0,2,19 | 0,2,18 | 0,2,13 | 0,2,12 | 0,2,11 | 0,2,6 | 0,2,5 | 0,2,3 | 0,2,2 | 0,2,1 | 0,2,0 |
| 0x080 | | | | | 0,3,27 | 0,3,25 | 0,3,22 | 0,3,21 | 0,3,19 | 0,3,18 | 0,3,15 | 0,3,12 | 0,3,11 | 0,3,8 | 0,3,7 | 0,3,6 | 0,3,5 | 0,3,4 | 0,3,1 |
| 0x0A0 | | | | | 0,4,14 | 0,4,13 | 0,4,12 | 0,4,11 | 0,4,10 | 0,4,9 | 0,4,8 | 0,4,7 | 0,4,6 | 0,4,5 | 0,4,4 | 0,4,3 | 0,4,2 | 0,4,1 | 0,4,0 |
| 0x0C0 | | | | | | 0,5,31 | 0,5,30 | 0,5,29 | 0,5,28 | 0,5,27 | 0,5,26 | 0,5,25 | 0,5,24 | 0,5,23 | 0,5,22 | 0,5,21 | 0,5,20 | 0,5,19 | 0,5,18 |
| 0x0E0 | | | | 0,6,25 | 0,6,24 | 0,6,23 | 0,6,22 | 0,6,21 | 0,6,20 | 0,6,19 | 0,6,18 | 0,6,17 | 0,6,16 | 0,6,15 | 0,6,14 | 0,6,13 | 0,6,12 | 0,6,11 | 0,6,0 |
| 0x100 | | | | 0,7,15 | 0,7,14 | 0,7,13 | 0,7,12 | 0,7,11 | 0,7,10 | 0,7,9 | 0,7,8 | 0,7,7 | 0,7,6 | 0,7,5 | 0,7,4 | 0,7,3 | 0,7,2 | 0,7,1 | 0,7,0 |
| 0x120 | | | | | 0,8,15 | 0,8,14 | 0,8,13 | 0,8,12 | 0,8,11 | 0,8,10 | 0,8,9 | 0,8,8 | 0,8,7 | 0,8,6 | 0,8,5 | 0,8,4 | 0,8,3 | 0,8,2 | 0,8,1 |

FIG. 7

| Address Offset (Bytes) | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| 0x000 | | | | | | | | | | | | | | 0,1,2 | 0,1,1 | 0,1,0 | 0,0,30 | 0,0,29 | 0,0,25 | 0,0,24 | 0,0,22 | 0,0,19 | 0,0,18 | 0,0,15 | 0,0,9 | 0,0,8 | 0,0,7 | 0,0,6 | 0,0,3 | 0,0,2 | 0,0,1 | 0,0,0 |
| 0x020 | | 0,3,27 | 0,3,25 | 0,3,22 | 0,3,21 | 0,3,19 | 0,3,18 | 0,3,15 | 0,3,12 | 0,3,11 | 0,3,8 | 0,3,7 | 0,3,6 | 0,3,5 | 0,3,4 | 0,3,1 | | 0,2,27 | 0,2,26 | 0,2,25 | 0,2,20 | 0,2,19 | 0,2,18 | 0,2,13 | 0,2,12 | 0,2,11 | 0,2,6 | 0,2,5 | 0,2,3 | 0,2,2 | 0,2,1 | 0,2,0 |
| 0x040 | | | 0,5,31 | 0,5,30 | 0,5,29 | 0,5,28 | 0,5,27 | 0,5,26 | 0,5,25 | 0,5,24 | 0,5,23 | 0,5,22 | 0,5,21 | 0,5,20 | 0,5,19 | 0,5,18 | | 0,4,14 | 0,4,13 | 0,4,12 | 0,4,11 | 0,4,10 | 0,4,9 | 0,4,8 | 0,4,7 | 0,4,6 | 0,4,5 | 0,4,4 | 0,4,3 | 0,4,2 | 0,4,1 | 0,4,0 |
| 0x080 | 0,7,15 | 0,7,14 | 0,7,13 | 0,7,12 | 0,7,11 | 0,7,10 | 0,7,9 | 0,7,8 | 0,7,7 | 0,7,6 | 0,7,5 | 0,7,4 | 0,7,3 | 0,7,2 | 0,7,1 | 0,7,0 | 0,6,25 | 0,6,24 | 0,6,23 | 0,6,22 | 0,6,21 | 0,6,20 | 0,6,19 | 0,6,18 | 0,6,17 | 0,6,16 | 0,6,15 | 0,6,14 | 0,6,13 | 0,6,12 | 0,6,11 | 0,6,0 |
| 0x0A0 | | | | | | | | | | | | | | | | | 0,8,15 | 0,8,14 | 0,8,13 | 0,8,12 | 0,8,11 | 0,8,10 | 0,8,9 | 0,8,8 | 0,8,7 | 0,8,6 | 0,8,5 | 0,8,4 | 0,8,3 | 0,8,2 | 0,8,1 | |

FIG. 8

| Address Offset (Bytes) | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| 0x000 | | | | | | | | | | | | | | 0,1,2 | 0,1,1 | 0,1,0 | 0,0,30 | 0,0,29 | 0,0,25 | 0,0,24 | 0,0,22 | 0,0,19 | 0,0,18 | 0,0,15 | 0,0,9 | 0,0,8 | 0,0,7 | 0,0,6 | 0,0,3 | 0,0,2 | 0,0,1 | 0,0,0 |
| 0x020 | 0,3,29 | 0,3,27 | 0,3,25 | 0,3,22 | 0,3,21 | 0,3,19 | 0,3,18 | 0,3,15 | 0,3,12 | 0,3,11 | 0,3,8 | 0,3,7 | 0,3,6 | 0,3,5 | 0,3,4 | 0,3,1 | 0,2,28 | 0,2,27 | 0,2,26 | 0,2,25 | 0,2,20 | 0,2,19 | 0,2,18 | 0,2,13 | 0,2,12 | 0,2,11 | 0,2,6 | 0,2,5 | 0,2,3 | 0,2,2 | 0,2,1 | 0,2,0 |
| 0x040 | | | 0,5,31 | 0,5,30 | 0,5,29 | 0,5,28 | 0,5,27 | 0,5,26 | 0,5,25 | 0,5,24 | 0,5,23 | 0,5,22 | 0,5,21 | 0,5,20 | 0,5,19 | 0,5,18 | | 0,4,14 | 0,4,13 | 0,4,12 | 0,4,11 | 0,4,10 | 0,4,9 | 0,4,8 | 0,4,7 | 0,4,6 | 0,4,5 | 0,4,4 | 0,4,3 | 0,4,2 | 0,4,1 | 0,4,0 |
| 0x080 | 0,7,15 | 0,7,14 | 0,7,13 | 0,7,12 | 0,7,11 | 0,7,10 | 0,7,9 | 0,7,8 | 0,7,7 | 0,7,6 | 0,7,5 | 0,7,4 | 0,7,3 | 0,7,2 | 0,7,1 | 0,7,0 | 0,6,25 | 0,6,24 | 0,6,23 | 0,6,22 | 0,6,21 | 0,6,20 | 0,6,19 | 0,6,18 | 0,6,17 | 0,6,16 | 0,6,15 | 0,6,14 | 0,6,13 | 0,6,12 | 0,6,11 | 0,6,0 |
| 0x0A0 | | | | | 0,0,62 | 0,0,61 | 0,0,60 | 0,0,46 | 0,0,45 | 0,0,44 | 0,0,43 | 0,0,41 | 0,0,40 | 0,0,38 | 0,0,34 | 0,0,33 | | 0,8,15 | 0,8,14 | 0,8,13 | 0,8,12 | 0,8,11 | 0,8,10 | 0,8,9 | 0,8,8 | 0,8,7 | 0,8,6 | 0,8,5 | 0,8,4 | 0,8,3 | 0,8,2 | 0,8,1 |
| 0x0C0 | | | | | | | | | | | | 0,2,61 | 0,2,60 | 0,2,59 | 0,2,58 | 0,2,29 | | | | | | | | | | | | | | | | |
| 0x0E0 | | | | | | | | | | | | | | | | | | | | | | | | | | | | | | 0,3,52 | 0,3,35 | 0,3,33 |
| 0x100 | | | | | | | | | | | | | | | 0,6,33 | 0,6,32 | | | | | | | | | | | | | | | | |

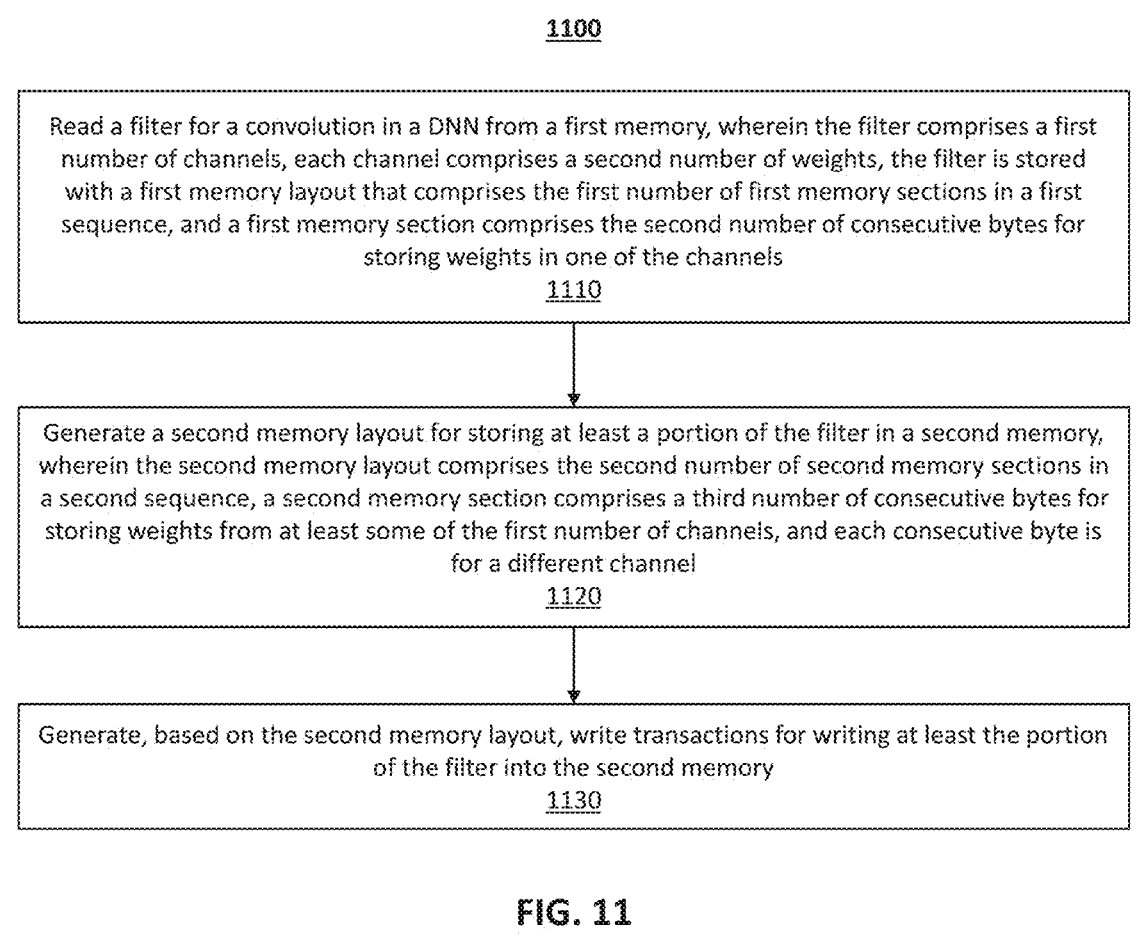

Read a filter for a convolution in a DNN from a first memory, wherein the filter comprises a first number of channels, each channel comprises a second number of weights, the filter is stored with a first memory layout that comprises the first number of first memory sections in a first sequence, and a first memory section comprises the second number of consecutive bytes for storing weights in one of the channels
1110

Generate a second memory layout for storing at least a portion of the filter in a second memory, wherein the second memory layout comprises the second number of second memory sections in a second sequence, a second memory section comprises a third number of consecutive bytes for storing weights from at least some of the first number of channels, and each consecutive byte is for a different channel
1120

Generate, based on the second memory layout, write transactions for writing at least the portion of the filter into the second memory
1130

FIG. 11

Deep Learning Environment
1200

Deep Learning Server
1210

DNN System 1240

Database 1250

Distributer 1260

Network 1230

Client Device 1220

Client Device 1220

Client Device 1220

TRANSPOSING MEMORY LAYOUT OF WEIGHTS IN DEEP NEURAL NETWORKS (DNNs)

TECHNICAL FIELD

This disclosure relates generally to neural networks, and more specifically, transposing memory layout of weights in DNNs.

BACKGROUND

DNNs are used extensively for a variety of artificial intelligence applications ranging from computer vision to speech recognition and natural language processing due to their ability to achieve high accuracy. However, the high accuracy comes at the expense of significant computation cost. DNNs have extremely high computing demands as each inference can require hundreds of millions of MAC (multiply-accumulate) operations as well as a large amount of data to read and write. Therefore, techniques to improve efficiency of DNNs are needed.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 4 illustrates a Kernel-Channel-Feature (KCF) memory layout of a set of weights, in accordance with various embodiments.

FIG. 5 illustrates a Kernel-Feature-Channel (KFC) memory layout of the set of weights in FIG. 4, in accordance with various embodiments.

FIG. 6 illustrates a KFC memory layout of a set of non-sparse weights, in accordance with various embodiments.

FIG. 7 illustrates another KFC memory layout of the set of non-sparse weights in FIG. 6, in accordance with various embodiments.

FIG. 8 illustrates yet another KFC memory layout of the set of non-sparse weights in FIG. 6, in accordance with various embodiments.

FIG. 9 illustrates a KFC memory layout where weights from different vectors are interleaved, in accordance with various embodiments.

FIG. 11 is a flowchart showing a method of deep learning, in accordance with various embodiments.

DETAILED DESCRIPTION

Overview

Figure 1:
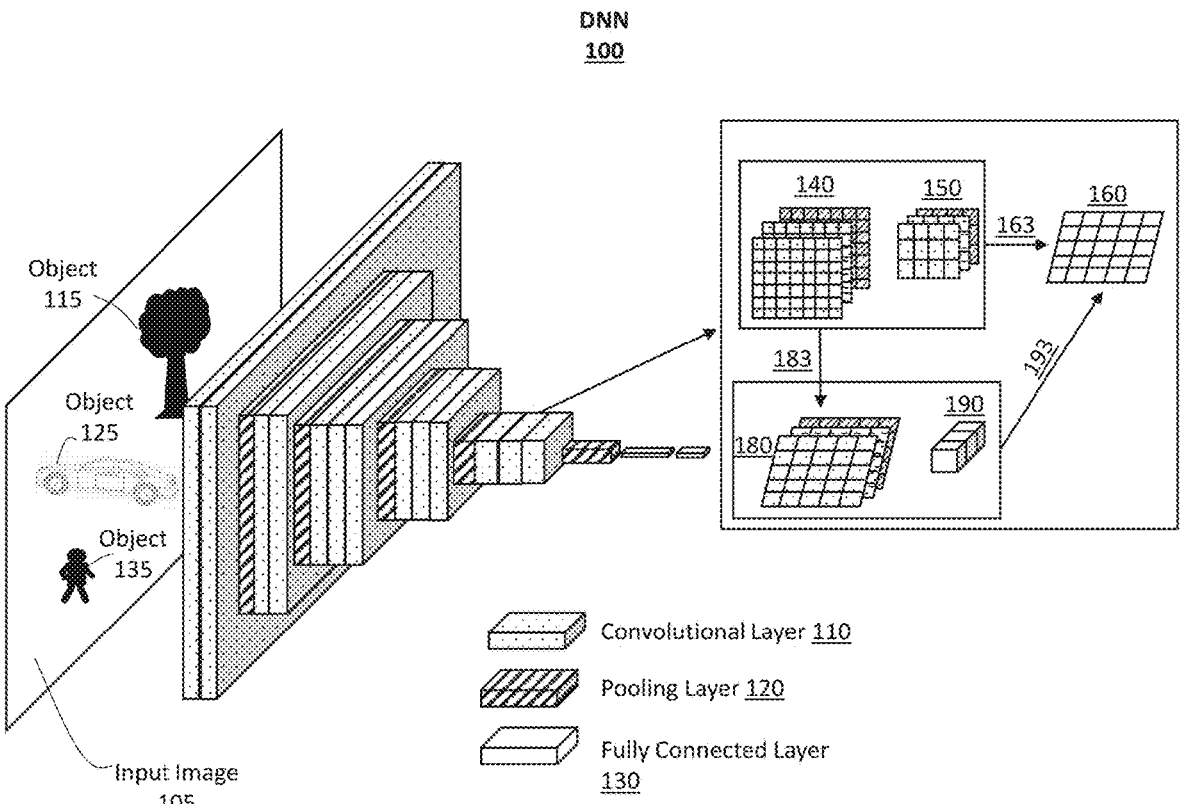
FIG. 1 illustrates an example DNN, in accordance with various embodiments.

The last decade has witnessed a rapid rise in AI (artificial intelligence) based data processing, particularly based on DNN. DNNs are widely used in the domains of computer vision, speech recognition, image, and video processing mainly due to their ability to achieve beyond human-level accuracy. The significant improvements in DNN model size and accuracy coupled with the rapid increase in computing power of execution platforms have led to the adoption of DNN applications even within resource constrained mobile and edge devices that have limited energy availability.

DNN applications are usually run on DNN accelerators. DNN accelerators, while executing DNN models, constantly read and write data from and to memory. A DNN accelerator may be a VPU (versatile processing unit). A DNN accelerator is usually a part of a larger SoC (system on chip) that has a heterogeneous computation architecture where various processing units can used for running a DNN application. The processing units in the SoC may be collectively referred to as XPUs (X processing units), which may include VPU, CPU (central processing unit), GPU (graphical processing unit), or other types of processing units. Different XPUs may be dynamically selected to run inference, e.g., based on availability of the XPUs, etc. Even though VPU may be the most efficient processing unit for processing a DNN workload, the DNN workload could be directed at the CPU and GPU.

A DNN can have millions, and in some cases billions, of pre-compiled weight values that are required to process a DNN workload. While it is preferable to have a single copy of the weights, CPU, GPU and the DNN accelerator often each have their preferred storage formats for optimal performance and power. Therefore, a single copy of weights in one format must be converted to the preferred format of the target XPU, as they are copied from the main memory into the local memory of the target XPU. For instance, a DNN accelerator may have logic for accelerating a DNN workload through sparse compression, whereby non-zero valued data is stored and computed, and zero valued data is skipped. The sparse compression can save compute resources and power needed for running DNN models and improve the performance of the DNN accelerator. However, such sparsity acceleration is not supported on CPU and GPU. Also, the DNN accelerator may process weights in different orders from CPU and GPU. Therefore, different data storage formats are needed to optimize performance of different processing units used for running a DNN workload.

A solution is to store multiple copies of the same set of weights in the main memory and provide the targeted processing units with the copy that is in the preferred format. However, given the large number of weights in a DNN, this solution typically requires a large memory footprint. Another solution is to store one copy of the weight and use software to reformat the weights at run-time. However, the software can be very slow, which can degrade the performance of the DNN accelerator. Therefore, improved technologies for storing weights for heterogeneous computation of DNN models is needed.

Embodiments of the present disclosure may improve on at least some of the challenges and issues described above by providing DNN accelerators with a DMA (direct memory access) engine that facilitates conversion of storage formats of weights in DNNs for optimizing performances of the DNN accelerators. The DMA engine may compress sparse weights to reduce the amount of data to be stored and processed. The DMA engine may also transpose a memory layout of the weights into a format that optimizes efficiency in the execution of a DNN by a DNN accelerator.

In various embodiments of the disclosure, a DNN inference system includes a DNN accelerator, one or more processing units, and a memory. The DNN accelerator may include a VPU. The one or more processing units may include a CPU, GPU, and so on. The memory may include a DRAM (dynamic random-access memory). The memory may store weights in a DNN with a memory layout in which the weights may be stored sequentially in a KCF order. In some embodiments (e.g., embodiment's where the memory stores weights of a convolution), the weights in the first channel of a filter of the convolution is stored first, followed by the weights in the second channel of the filter, and this continues till the weights in the last channel of the filer is stored. In embodiments where the convolution includes multiple filters, the last weight in the last channel of the first filter may be followed by the weights in the first channel of the second filter, which are followed by the weights in the second channel of the second filter till the weights in the last channel of the second filter is stored. The last weight in the last channel of the second filter may be followed by the third filter (if any), till all the filters of the convolution are stored. The memory may store all the weights in each filter, including non-zero valued weights and zero valued weights. Such a memory layout may be optimized for some of the processing units in the DNN inference system or for the whole DNN inference system, but may be non-optimal for the DNN accelerator, which can be accelerated through sparsity processing and computes weights in a KFC order.

The DMA engine in the DNN accelerator may read weights from the memory with the KCF memory layout and transpose the KCF memory layout to a KFC memory layout. With the KFC memory layout, the weights in a vector across different channels in the first filter is stored first. Each weight in the vector may be from a different channel. The length of the vector (i.e., number of weights in the vector) may be equal to or shorter than the depth of the filter (i.e., the number of channels in the filter). The last weight in the vector may be followed by the weights in the next vector, till all the vectors in the first filter are stored. In some embodiments, the sequence of the vectors in the KFC memory layout may depend on the positions of the vectors in the filter. The last weight in the last vector of the first filter may be followed by the weights in the first vector of the second filter, then the weights in the second vector of the second filter, till all the vectors are stored. The second filter may be followed by the third filter (if any), till all the filters are stored.

The DMA engine may also remove sparse weights (i.e., weights having values of zero) and store non-sparse weights (i.e., weights having non-zero values) in the KFC memory layout. The DMA engine may determine a stride for the KFC memory layout. The stride defines a fixed number of bytes in the KFC memory layout. The KFC includes a plurality of memory sections, the size of each memory section is the stride. In some embodiments, the fixed number may be determined based on the number of non-sparse weights in the least sparse vector in a filter. The least sparse vector is the vector that has the least sparse weights, i.e., the most non-sparse weights. The other vectors in the filter have no more non-sparse weights than the least sparse vector. The fixed number of bytes can be sufficient to store the non-sparse weights in each of the vectors in the filter.

In other embodiments, the fixed number may be independent from the number of non-sparse weights in the least sparse vector in a filter. For instance, the fixed number of bytes may be insufficient for storing all the non-sparse weights in a vector. The KFC memory layout may include multiple sequences of memory sections. The first sequence includes a number of memory sections having the fixed number of bytes, and the number of memory sections in the sequence may equal the number of weights in an individual channel. For any non-sparse weights that are not stored in the first sequence of memory sections, they can be stored in the second sequence, then the third sequence (if any), and so on.

As the DMA engine is capable of transposing KCF memory layouts to KFC memory layouts and removing sparse weights, the memory does not have to store multiple copies of the same weights. Also, software for reformatting data storage is not needed. The DMA engine can also save storage space needed in the DNN accelerator and facilitate the sparsity logic in the DNN accelerator, which minimizes or even avoids degradation in the performance of the DNN accelerator.

For purposes of explanation, specific numbers, materials and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

Further, references are made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicates that different instances of like objects are being referred to and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value based on the input operand of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the input operand of a particular value as described herein or as known in the art.

In addition, the terms "comprise," "comprising," "include," "including," "have," "having" or any other variation thereof, are intended to cover a non-exclusive inclusion. For example, a method, process, device, or DNN accelerator that comprises a list of elements is not necessarily limited to only those elements but may include other elements not expressly listed or inherent to such method, process, device, or DNN accelerators. Also, the term "or" refers to an inclusive "or" and not to an exclusive "or."

The DNN systems, methods and devices of this disclosure each have several innovative aspects, no single one of which is solely responsible for all desirable attributes disclosed herein. Details of one or more implementations of the subject matter described in this specification are set forth in the description below and the accompanying drawings.

Example DNN

FIG. 1 illustrates an example DNN 100, in accordance with various embodiments. For purpose of illustration, the DNN 100 in FIG. 1 is a convolutional neural network (CNN). In other embodiments, the DNN 100 may be other types of DNNs. The DNN 100 is trained to receive images and output classifications of objects in the images. In the embodiments of FIG. 1, the DNN 100 receives an input image 105 that includes objects 115, 125, and 135. The DNN 100 includes a sequence of layers comprising a plurality of convolutional layers 110 (individually referred to as "convolutional layer 110"), a plurality of pooling layers 120 (individually referred to as "pooling layer 120"), and a plurality of fully connected layers 130 (individually referred to as "fully connected layer 130"). In other embodiments, the DNN 100 may include fewer, more, or different layers. In an inference of the DNN 100, the layers of the DNN 100 execute tensor computation that includes many tensor operations, such as convolution (e.g., multiply-accumulate (MAC) operations, etc.), pooling operations, elementwise operations (e.g., elementwise addition, elementwise multiplication, etc.), other types of tensor operations, or some combination thereof.

The convolutional layers 110 summarize the presence of features in the input image 105. The convolutional layers 110 function as feature extractors. The first layer of the DNN 100 is a convolutional layer 110. In an example, a convolutional layer 110 performs a convolution on an input tensor 140 (also referred to as input feature map (IFM) 140) and a filter 150. As shown in FIG. 1, the IFM 140 is represented by a 7×7×3 three-dimensional (3D) matrix. The IFM 140 includes 3 input channels, each of which is represented by a 7×7 two-dimensional (2D) matrix. The 7×7 2D matrix includes 7 input elements (also referred to as input points) in each row and 7 input elements in each column. The filter 150 is represented by a 3×3×3 3D matrix. The filter 150 includes 3 kernels, each of which may correspond to a different input channel of the IFM 140. A kernel is a 2D matrix of weights, where the weights are arranged in columns and rows. A kernel can be smaller than the IFM. In the embodiments of FIG. 1, each kernel is represented by a 3×3 2D matrix. The 3×3 kernel includes 3 weights in each row and 3 weights in each column. Weights can be initialized and updated by backpropagation using gradient descent. The magnitudes of the weights can indicate importance of the filter 150 in extracting features from the IFM 140.

The convolution includes MAC operations with the input elements in the IFM 140 and the weights in the filter 150. The convolution may be a standard convolution 163 or a depthwise convolution 183. In the standard convolution 163, the whole filter 150 slides across the IFM 140. All the input channels are combined to produce an output tensor 160 (also referred to as output feature map (OFM) 160). The OFM 160 is represented by a 5×5 2D matrix. The 5×5 2D matrix includes 5 output elements (also referred to as output points) in each row and 5 output elements in each column. For purpose of illustration, the standard convolution includes one filter in the embodiments of FIG. 1. In embodiments where there are multiple filters, the standard convolution may produce multiple output channels in the OFM 160.

The multiplication applied between a kernel-sized patch of the IFM 140 and a kernel may be a dot product. A dot product is the elementwise multiplication between the kernel-sized patch of the IFM 140 and the corresponding kernel, which is then summed, always resulting in a single value. Because it results in a single value, the operation is often referred to as the "scalar product." Using a kernel smaller than the IFM 140 is intentional as it allows the same kernel (set of weights) to be multiplied by the IFM 140 multiple times at different points on the IFM 140. Specifically, the kernel is applied systematically to each overlapping part or kernel-sized patch of the IFM 140, left to right, top to bottom. The result from multiplying the kernel with the IFM 140 one time is a single value. As the kernel is applied multiple times to the IFM 140, the multiplication result is a 2D matrix of output elements. As such, the 2D output matrix (i.e., the OFM 160) from the standard convolution 163 is referred to as an OFM.

In the depthwise convolution 183, the input channels are not combined. Rather, MAC operations are performed on an individual input channel and an individual kernel and produce an output channel. As shown in FIG. 1, the depthwise convolution 183 produces a depthwise output tensor 180. The depthwise output tensor 180 is represented by a 5×5×3 3D matrix. The depthwise output tensor 180 includes 3 output channels, each of which is represented by a 5×5 2D matrix. The 5×5 2D matrix includes 5 output elements in each row and 5 output elements in each column. Each output channel is a result of MAC operations of an input channel of the IFM 140 and a kernel of the filter 150. For instance, the first output channel (patterned with dots) is a result of MAC operations of the first input channel (patterned with dots) and the first kernel (patterned with dots), the second output channel (patterned with horizontal strips) is a result of MAC operations of the second input channel (patterned with horizontal strips) and the second kernel (patterned with horizontal strips), and the third output channel (patterned with diagonal stripes) is a result of MAC operations of the third input channel (patterned with diagonal stripes) and the third kernel (patterned with diagonal stripes). In such a depthwise convolution, the number of input channels equals the number of output channels, and each output channel corresponds to a different input channel. The input channels and output channels are referred to collectively as depthwise channels. After the depthwise convolution, a pointwise convolution 193 is then performed on the depthwise output tensor 180 and a 1×1×3 tensor 190 to produce the OFM 160.

The OFM 160 is then passed to the next layer in the sequence. In some embodiments, the OFM 160 is passed through an activation function. An example activation function is the rectified linear activation function (ReLU). ReLU is a calculation that returns the value provided as input directly, or the value zero if the input is zero or less. The convolutional layer 110 may receive several images as input and calculate the convolution of each of them with each of the kernels. This process can be repeated several times. For instance, the OFM 160 is passed to the subsequent convolutional layer 110 (i.e., the convolutional layer 110 following the convolutional layer 110 generating the OFM 160 in the sequence). The subsequent convolutional layers 110 performs a convolution on the OFM 160 with new kernels and generates a new feature map. The new feature map may also be normalized and resized. The new feature map can be kernelled again by a further subsequent convolutional layer 110, and so on.

In some embodiments, a convolutional layer 110 has 4 hyperparameters: the number of kernels, the size F kernels (e.g., a kernel is of dimensions F×F×D pixels), the S step with which the window corresponding to the kernel is dragged on the image (e.g., a step of one means moving the window one pixel at a time), and the zero-padding P (e.g., adding a black contour of P pixels thickness to the input image of the convolutional layer 110). The convolutional layers 110 may perform various types of convolutions, such as 2-dimensional convolution, dilated or atrous convolution, spatial separable convolution, depthwise separable convolution, transposed convolution, and so on. The DNN 100 includes 16 convolutional layers 110. In other embodiments, the DNN 100 may include a different number of convolutional layers.

The pooling layers 120 down-sample feature maps generated by the convolutional layers, e.g., by summarizing the presence of features in the patches of the feature maps. A pooling layer 120 is placed between 2 convolution layers 110: a preceding convolutional layer 110 (the convolution layer 110 preceding the pooling layer 120 in the sequence of layers) and a subsequent convolutional layer 110 (the convolution layer 110 subsequent to the pooling layer 120 in the sequence of layers). In some embodiments, a pooling layer 120 is added after a convolutional layer 110, e.g., after an activation function (e.g., ReLU) has been applied to the OFM 160.

A pooling layer 120 receives feature maps generated by the preceding convolution layer 110 and applies a pooling operation to the feature maps. The pooling operation reduces the size of the feature maps while preserving their important characteristics. Accordingly, the pooling operation improves the efficiency of the DNN and avoids over-learning. The pooling layers 120 may perform the pooling operation through average pooling (calculating the average value for each patch on the feature map), max pooling (calculating the maximum value for each patch of the feature map), or a combination of both. The size of the pooling operation is smaller than the size of the feature maps. In various embodiments, the pooling operation is 2×2 pixels applied with a stride of 2 pixels, so that the pooling operation reduces the size of a feature map by a factor of 2, e.g., the number of pixels or values in the feature map is reduced to one quarter the size. In an example, a pooling layer 120 applied to a feature map of 6×6 results in an output pooled feature map of 3×3. The output of the pooling layer 120 is inputted into the subsequent convolution layer 110 for further feature extraction. In some embodiments, the pooling layer 120 operates upon each feature map separately to create a new set of the same number of pooled feature maps.

The fully connected layers 130 are the last layers of the DNN. The fully connected layers 130 may be convolutional or not. The fully connected layers 130 receive an input operand. The input operand defines the output of the convolutional layers 110 and pooling layers 120 and includes the values of the last feature map generated by the last pooling layer 120 in the sequence. The fully connected layers 130 apply a linear combination and an activation function to the input operand and generate an individual partial sum. The individual partial sum may contain as many elements as there are classes: element i represents the probability that the image belongs to class i. Each element is therefore between 0 and 1, and the sum of all is worth one. These probabilities are calculated by the last fully connected layer 130 by using a logistic function (binary classification) or a softmax function (multi-class classification) as an activation function.

In some embodiments, the fully connected layers 130 classify the input image 105 and return an operand of size N, where N is the number of classes in the image classification problem. In the embodiments of FIG. 1, N equals 3, as there are 3 objects 115, 125, and 135 in the input image. Each element of the operand indicates the probability for the input image 105 to belong to a class. To calculate the probabilities, the fully connected layers 130 multiply each input element by weight, make the sum, and then apply an activation function (e.g., logistic if N=2, softmax if N>2). This is equivalent to multiplying the input operand by the matrix containing the weights. In an example, the individual partial sum includes 3 probabilities: a first probability indicating the object 115 being a tree, a second probability indicating the object 125 being a car, and a third probability indicating the object 135 being a person. In other embodiments where the input image 105 includes different objects or a different number of objects, the individual partial sum can be different.

Example Convolution

Figure 2:
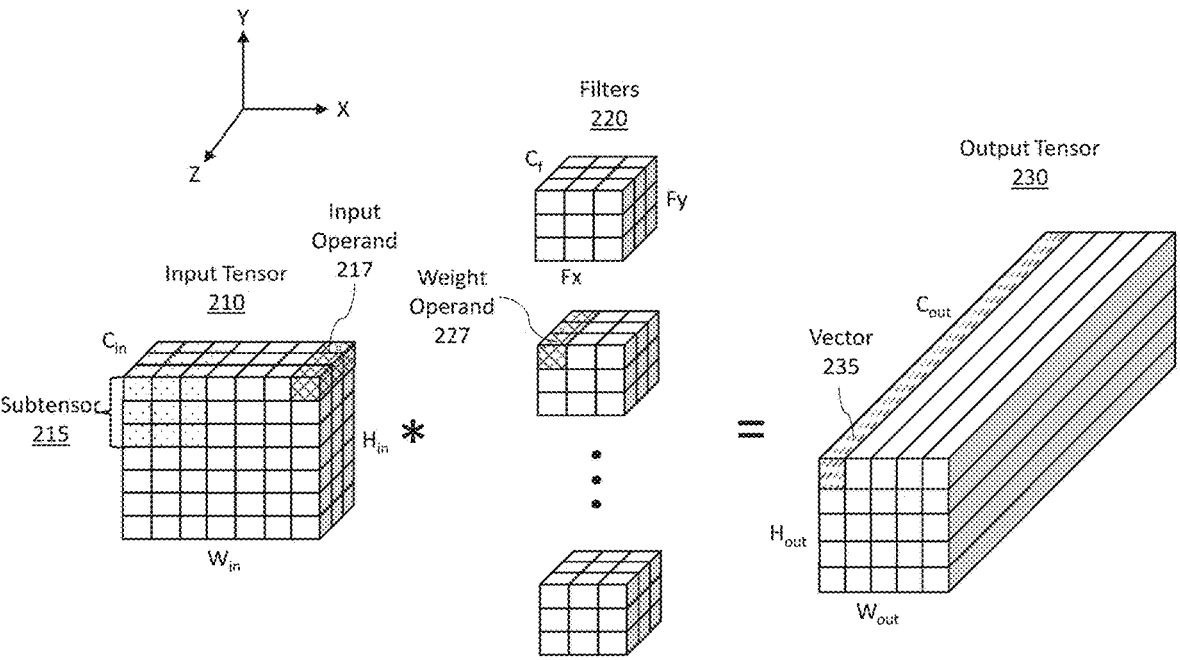
FIG. 2 illustrates an example convolution, in accordance with various embodiments.

FIG. 2 illustrates an example convolution, in accordance with various embodiments. The convolution may be a convolution in a convolutional layer of a DNN, e.g., a convolutional layer 110 in FIG. 1. The convolution can be executed on an input tensor 210 and filters 220 (individually referred to as "filter 220"). A result of the convolution is an output tensor 230. In some embodiments, the convolution is performed by a compute block, such as the compute block 330 in FIG. 3. The output tensor may be written into an external memory (e.g., the memory 303 in FIG. 3) from a local memory (e.g., the memory 370 in FIG. 3) of the compute block (e.g., the computer block 330 in FIG. 3) by a DMA engine, such as the DMA engine 320 in FIG. 3.

In the embodiments of FIG. 2, the input tensor 210 includes activations (also referred to as "elements," or "input activations") arranged in a 3D matrix. An input element is a data point in the input tensor 210. The input tensor 210 has a spatial size $H_{in} \times W_{in} \times C_{in}$, where $H_{in}$ is the height of the 3D matrix (i.e., the length along the Y axis, which indicates the number of activations in a column in the 2D matrix of each input channel), $W_{in}$ is the width of the 3D matrix (i.e., the length along the X-axis, which indicates the number of activations in a row in the 2D matrix of each input channel), and $C_{in}$ is the depth of the 3D matrix (i.e., the length along the Z-axis, which indicates the number of input channels). For purpose of simplicity and illustration, the input tensor 210 has a spatial size of 7×7×3, i.e., the input tensor 210 includes three input channels and each input channel has a 7×7 2D matrix. Each input element in the input tensor 210 may be represented by a (X, Y, Z) coordinate. In other embodiments, the height, width, or depths of the input tensor 210 may be different.

Each filter 220 includes weights arranged in a 3D matrix. The values of the weights may be determined through training the DNN. A filter 220 has a spatial size $F_x \times F_y \times C_f$, where $H_f$ is the height of the filter (i.e., the length along the Y axis, which indicates the number of weight in a column in each kernel), $W_f$ is the width of the filter (i.e., the length along the X-axis, which indicates the number of weights in a row in each kernel), and $C_f$ is the depth of the filter (i.e., the length along the Z-axis, which indicates the number of channels). In some embodiments, $C_f$ equals $C_{in}$. For purpose of simplicity and illustration, each filter 220 in FIG. 2 has a spatial size of 3×3×3, i.e., the filter 220 includes 3 convolutional kernels with a spatial size of 3×3. In other embodiments, the height, width, or depths of the filter 220 may be different. The spatial size of the convolutional kernels is smaller than the spatial size of the 2D matrix of each input channel in the input tensor 210. In other embodiments, the spatial size of the kernels and the 2D matrix of each input channel in the input tensor 210 are the same.

An activation or weight may take one or more bytes in a memory. The number of bytes for an activation or weight may depend on the data format. For example, when the activation or weight has a INT8 format, the output activation takes one byte. When the activation or weight has a FP16 format, the activation or weight takes two bytes. Other data formats may be used for activations or weights.

In the convolution, each filter 220 slides across the input tensor 210 and generates a 2D matrix for an output channel in the output tensor 230. In the embodiments of FIG. 2, the 2D matrix has a spatial size of 5×5. The output tensor 230 includes activations (also referred to as "output activations," "elements," or "output element") arranged in a 3D matrix. An output activation is a data point in the output tensor 230. The output tensor 230 has a spatial size $H_{out} \times W_{out} \times C_{out}$, where $H_{out}$ is the height of the 3D matrix (i.e., the length along the Y axis, which indicates the number of output activations in a column in the 2D matrix of each output channel), $W_{out}$ is the width of the 3D matrix (i.e., the length along the X-axis, which indicates the number of output activations in a row in the 2D matrix of each output channel), and $C_{out}$ is the depth of the 3D matrix (i.e., the length along the Z-axis, which indicates the number of output channels). $C_{out}$ may equal the number of filters 220 in the convolution. $H_{out}$ and $W_{out}$ may depend on the heights and widths of the input tensor 210 and each filter 220.

In a step of the convolution, MAC operations can be performed on a 3×3×3 subtensor 215 (which is highlighted with a dotted pattern in FIG. 2) in the input tensor 210 and each filter 220. The result of the MAC operations on the subtensor 215 and one filter 220 is an output activation. In some embodiments (e.g., embodiments where the convolution is an integral convolution), an output activation may include 8 bits, e.g., one byte. In other embodiments (e.g., embodiments where the convolution is a floating-point convolution), an output activation may include more than one byte. For instance, an output element may include two bytes.

After the MAC operations on the subtensor 215 and all the filters 220 are finished, a vector 235 is produced. The vector 235 is highlighted with slashes in FIG. 2. The vector 235 includes a sequence of output activations, which are arranged along the Z-axis. The output activations in the vector 235 have the same (x, y) coordinate, but the output activations correspond to different output channels and have different Z coordinates. The dimension of the vector 235 along the Z-axis may equal the total number of output channels in the output tensor 230. After the vector 235 is produced, further MAC operations are performed to produce additional vectors till the output tensor 230 is produced.

The convolution includes a series of steps, each step is performed on an $F_x \times F_y \times C_f$ subtensor and each filter 220. A subtensor includes F ($F = F_x \times F_y$) input vectors. An example input vector is an input vector 217 highlighted in FIG. 2. Each input vector includes $C_{in}$ activations that have the same (X,Y) coordinate but different Z coordinates. An input vector may be represented by the (X,Y) coordinate of the input activations therein. Each of the activations is from a different input channel. Similarly, a filter 220 includes F weight vectors. An example weight vector is a weight vector 227 highlighted in FIG. 2. Each weight vector includes $C_f$ weights that have the same (X,Y) coordinate but different Z coordinates. A weight vector may be represented by the (X,Y) coordinate of the weights therein. In some embodiments, a MAC unit in a compute block can receive an input vector and a weight vector or a portion of an input vector and the corresponding portion of a weight vector, or multiple input vectors and multiple weight vectors) in a round of its operation. The weights may be stored in a local memory of the compute block. In some embodiments, the weights are written into the local memory from an external memory by a DMA engine (e.g., the DMA engine 320 in FIG. 3).

Example DNN Inference System with DNN Accelerator

Figure 3:
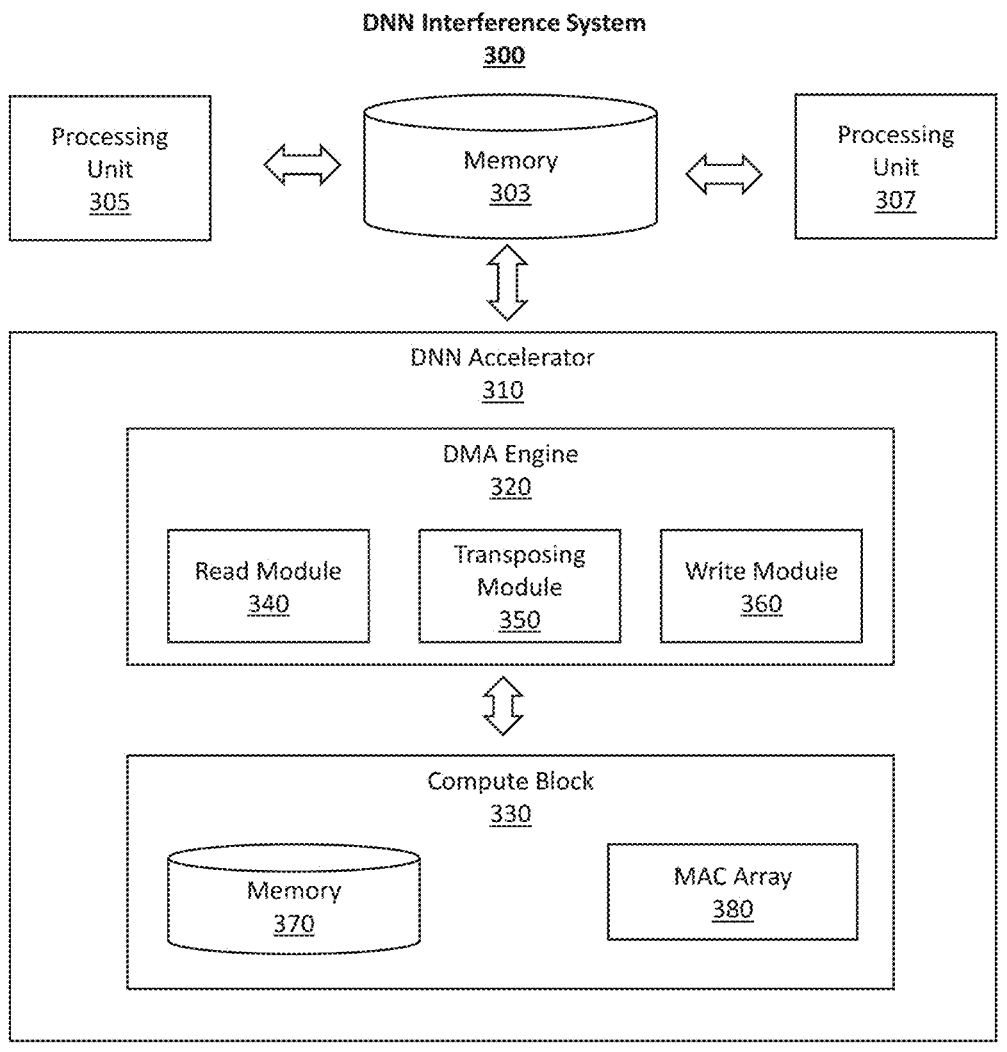
FIG. 3 is a block diagram of a DNN accelerator, in accordance with various embodiments.

FIG. 3 illustrates a DNN inference system 300, in accordance with various embodiments. The DNN inference system 300 can run DNN models, e.g., the DNN 100 in FIG. 1. The DNN inference system 300 includes a DNN accelerator 310, a memory 303, and processing units 305 and 307. In other embodiments, alternative configurations, different or additional components may be included in the DNN inference system 300. For instance, the DNN inference system 300 may include more than one memory 303, more than one DNN accelerator 310, or a different number of processing units. Further, functionality attributed to a component of the DNN inference system 300 may be accomplished by a different component included in the DNN inference system 300 or by a different system.

The memory 303 stores data to be used by the processing units 305 and 307 and the DNN accelerator 310 to perform deep learning operations in DNN models. Example deep learning operations include convolutions (also referred to as "convolutional operations"), pooling operations, element-wise operations, other types of deep learning operations, or some combination thereof. The memory 303 may be a main memory of the DNN accelerator 310. In some embodiments, the memory 303 includes one or more DRAMs.

In embodiments where the memory 303 stores data for a convolution, the memory 303 stores one or more filters for the convolution. Examples of filters include the filter 150 in FIG. 1 and the filters 220 in FIG. 2. The spatial size of a filter may be $F_x \times F_y \times C_f$. The filter may include C channels, and each channel has F ($F = F_x \times F_y$) weights. The weights in a channel may be arranged in a 2D array. The weights can be read from the memory 303 and written into the memory 370 through the DMA engine 320. The values of the weights can be determined by training the DNN, e.g., by the training module 1320 in FIG. 13.

In some embodiments, the memory 303 stores all the weights in the filter(s) of the convolution, including zero valued weights. The weights may be stored in a KCF memory layout in the memory 303. In the KCF memory layout, the F weights in the first channel are stored first, followed by the F weights in the second channel, then the F weights in the third channel, till all the channels are stored. The last byte in the last channel of the filter may be followed by the first byte in the first channel of the next filter. This continues till the last byte in the last channel of the last filter is stored.

In some embodiments, the memory 303 may also store the input tensor and output tensor of the convolution. The output tensor can be transmitted from the memory 370 to the memory 303 through the DMA engine 320. In other embodiments, the input tensor or output tensor is not stored in the memory 303. For instance, the input tensor may be directly transmitted from an internal memory of another compute block to the memory 370 in the compute block 330. The output tensor may be directly transmitted from the memory 370 in the compute block 330 into an internal memory of another compute block. The input tensor may be a 3D matrix and include $C_{in}$ input channels. Examples of the input tensor include the input tensor 140 in FIG. 1 and the input tensor 210 in FIG. 2. The output tensor may be a 3D matrix and include $C_{out}$ output channels. Examples of the output tensor include the output tensor 160 in FIG. 1 and the output 230 in FIG. 2.

The data stored in the memory 303 may be provided to the processing units 305 and 307 and the DNN accelerator 310. In some embodiments, the processing units 305 and 307 and the DNN accelerator 310 may receive different data from the memory 303. In other embodiments, the processing units 305 and 307 and the DNN accelerator 310 may receive the same data from the memory 303. For instance, the processing units 305 and 307 and the DNN accelerator 310 may receive the same set of weights from the memory 303 for performing a convolution in parallel. In an embodiment, the processing unit 305 or 307 may include a CPU or GPU. The DNN accelerator 310 may include a VPU. The processing unit 305 or 307 or the DNN accelerator 310 may be the processing device 1402 in FIG. 14.

The DNN accelerator 310 runs deep learning operations in an accelerated fashion with the data. For instance, the DNN accelerator 310 may process sparsity and generate dense data (e.g., data having non-zero values) from the data received from the memory 303. As shown in FIG. 3, the DNN accelerator 310 includes a DMA engine 320 and a compute block 330. In other embodiments, the DNN accelerator 310 may include more, fewer, or different components.

The DMA engine 320 facilitates data transfer between the memory 303 and the memory 370. For example, the DMA engine 320 can read data from the memory 303 and write data into the memory 370. As another example, the DMA engine 320 can read data from the memory 370 and write data into the memory 303. The DMA engine 320 provides a DMA feature that allows the compute block 330 to initiate data transfer between the memory 303 and the memory 370 and to perform other operations while the data transfer is in program. The DMA engine 320 can read weights from the memory 303, transpose the memory layout of the weights in a way that is optimized for the compute block 330 before it writes the weights into the memory 370 in the compute block 330.

As shown in FIG. 3, the DMA engine 320 includes a read module 340, a transposing module 350, and a write module 360. In other embodiments, alternative configurations, different or additional components may be included in the DMA engine 320. Further, functionality attributed to a component of the DMA engine 320 may be accomplished by a different component included in the DMA engine 320, a component in the DNN accelerator 310, or by a different system.

The read module 340 reads data from the memory 303. The read module 340 may read input activations and weights from the memory 303 for facilitating the compute block 330 to perform MAC operations. In some embodiments, the read module 340 sends read requests to the memory 303 to read data. A read request may specify an address in the memory 303 from which data will be fetched. An address in the memory 303 may include a certain number of bytes. In some embodiments, the number of bytes at an address is fixed. The number, for example, may be 32. The read module 340 may read a set of weights from the memory 303 from a sequence of addresses. The set of weights may be weights in one or more filters of a convolution. The set of weights received by the read module 340 may be arranged in a KCF memory layout. The KCF memory layout may include one or more segments for the one or more filters. In embodiments where the convolution has multiple filters, the KCF memory may include multiple segments sequentially arranged based on an order of the filters. Each segment (or the whole KCF memory layout in embodiments where there is one filter) may start with the F weights in the first channel of the filter, followed by the F weights in the second channel, then the third channel, till the last channel. Within an individual channel, the F weights may be stored in an order following the (X,Y) coordinates of the F weights. More details regarding KCF memory layout are described below in conjunction with FIG. 4.

The transposing module 350 transposes storage format of weights received by the read module 340 from the memory 303. The transposing module 350 may also provide the transposed storage format to the write module 360 for the writing module to write some or all of the weights into an internal memory of the compute block 330 (e.g., the memory 370). In some embodiments, the transposing module 350 may convert a KCF layout of weights into a KFC layout. The transposing module 350 may also compress the weights based on sparsity. For instance, the transposing module may identify sparse weights and exclude the sparse weights from the KFC layout.

In an embodiment, the transposing module 350 may generate a KFC memory layout that starts with the weights in the first vector of a filter, followed by weights in the second vector of the filter, till the last vector of the filter. A vector may include weights having the same (X,Y) coordinates. The number of weights in a vector may be equal to $C_f$, e.g., in embodiments where the transposing module 350 performs no sparse compression or the vector does not include any sparse weights. Alternatively, the number of weights in a vector may be less than $C_f$, e.g., in embodiments where the transposing module 350 excludes one or more sparse weights from the vector. In embodiments where the transposing module 350 receives more than one filter, the filters may be arranged one after another in the memory layout. More details regarding KFC memory layout are described below in conjunction with FIG. 5.

The transposing module 350 may also determine a stride for the KFC memory layout. The stride defines a fixed number of bytes for a vector before the first byte for the next vector starts. The stride can specify a plurality of memory sections (or storage sections) in the memory layout, and each memory section includes the fixed number of bytes. In some embodiments, the fixed number of bytes may be determined, e.g., by a compiler associated with the DNN inference system 300 at a compile time, based on the least sparse vector in the one or more filters in the KFC memory layout. The least sparse vector is a vector that includes least sparse weights or most non-sparse weights. The least sparse vector may also be referred to as a most dense vector. The stride can, therefore, have sufficient (or more than needed) bytes for non-sparse weights in all the vectors. The first byte in each stride may be the first non-sparse weight in each vector. More details regarding memory layout with a stride determined based on the least sparse vector are provided below in conjunction with FIGS. 7 and 8.

In other embodiments (e.g., the least sparse vector cannot be identified at the compile time or it is too costly to identify the least sparse vector), the stride may not be determined based on sparsity. The stride may not have sufficient bytes for the non-sparse weights in all the vectors. The non-sparse weights from different vectors may be interleaved in embodiments where the stride is smaller than the least dense vector. For instance, the stride-sized portion of each vector can be stored contiguously before storing the next stride-sized portion of each vector. This may be repeated till all the non-sparse weights in all the vectors are stored. The memory layout may include multiple sequences of memory sections. Each of the memory sections in the first sequence may include the first stride-size portion of each vector. The memory sections may be in an order determined based on their (X,Y) coordinates. The memory sections in the second (or third, or further subsequent) sequence may include another stride-size portion of each vector. The number of memory sections in the second or further subsequent sequence may be less the number of vectors, e.g., in embodiments where the non-sparse weights of one or more vector can be all stored in the first sequence. More details regarding memory layout with a stride smaller than the least sparse vector are provided below in conjunction with FIG. 9.

The KFC layout can facilitate feeding the weights into the compute block 330 for deep learning operations. In an example of a MAC operation, a MAC unit in the compute block 330 may need a weight vector and the corresponding input vector to perform MAC operations. In order to fetch a weight vector, the position of the first non-sparse weight in the vector needs to be determined. With a KCF memory layout, the position of the first non-sparse weight in a vector is dependent on the number of non-sparse weights in preceding vectors. Thus, the number of non-sparse weights for each vector cannot be determined until the last vectors in the filter is received, which can require a temporary storage (e.g., buffer) of all the vectors in order to fetch a single vector for MAC operations. The cost of buffering can be significant. In contrast, with the KFC memory layout, the position of the first non-sparse weight in each vector may be determined based on the stride and therefore, it is unnecessary to buffer all the vector during transpose operation, which can significantly reduce the cost of buffering. Therefore, the KFC storage format, with fixed stride, is more advantageous than the KCF storage format for the DNN accelerator 310.

The write module 360 writes data into the memory 370 or the memory 303. In some embodiments, the write module

360 writes a set of weights into the memory 370 based on a storage format of the weights determined by the transposing module 350. The write module 360 may generate write requests. A write request may include an address in the memory 370 where the data in the write request will be stored. The write module 360 may generate the addresses for the set of weights based on a memory layout of the weights that is generated by the transposing module 350. The memory layout may be a KFC memory layout.

The compute block 330 performs computation for deep learning operations. The compute block 330 may run the operations in a DNN layer, or a portion of the operations in the DNN layer. In some embodiments, the operations of the DNN layers may be run by one or more other compute tiles in parallel with the compute block 330. The compute block 330 may perform convolutions, e.g., standard convolution or depthwise convolution. In some embodiments, the compute block 330 receives an input tensor and one or more convolutional kernels and performs a convolution with the input tensor and convolutional kernels. The result of the convolution may be an output tensor, which can be further computed, e.g., by another compute tile. In some embodiments, the compute block 330 is referred to as a compute tile, and the DNN accelerator 310 may include multiple compute tiles that can operate in parallel.

As shown in FIG. 3, the compute block 330 includes a memory 370 and an MAC array 380. In other embodiments, alternative configurations, different or additional components may be included in the compute block 330. For instance, the compute block 330 may include a sparsity processing module that processes sparsity in input tensors and filters before providing the input tensors and filters to the MAC array 380. Further, functionality attributed to a component of the compute block 330 may be accomplished by a different component included in the compute block 330, a component in the DNN accelerator 310, or by a different system.

The memory 370 is local to the compute block 330. In the embodiments of FIG. 3, the memory 370 is inside the compute block 330. In other embodiments, the memory 370 may be outside the compute block 330. The memory 370 and the compute block 330 can be implemented on the same chip. The memory 370 stores data used for or generated from convolutions, e.g., input tensors, filters, and output tensors. In some embodiments, the memory 370 includes one or more SRAMs (static random-access memories). The memory 370 may be register files. Some of the register files may be designated for input activations, weights, or output activations. In some embodiments, the memory 370 may also include one or more cache memories.

An input tensor or filter may be written into the memory 370 by the DMA engine 320. An output tensor may be written into the memory 370 by the DMA engine 320. The output tensor may be used as the input tensor of the next convolutional layer, at least a portion of which can be run by the MAC array 380. Data can be written to various addresses in the memory 370. In some embodiments, an address in the memory 370 corresponds to a fixed number of bytes. The fixed number, in an example, may be 32. The memory 370 may include one or more sequences of addresses for storing one or more sequences of bytes.

The MAC array 380 includes MAC units arranged in columns, or columns and rows. Each MAC unit can perform MAC operations. In some embodiments, a MAC unit includes a multiply unit for performing multiplications. An MAC unit may also include an accumulate unit for performing accumulations. A column of MAC units is referred to as an MAC column. An MAC column may be associated with one or more MAC lanes. A MAC lane is a path for loading data into a MAC column. A MAC lane may be also referred to as a data transmission lane or data loading lane. A MAC column may have multiple MAC lanes. The loading bandwidth of the MAC column is an aggregation of the loading bandwidths of all the MAC lanes associated with the MAC column. With a certain number of MAC lanes, data can be fed into the same number of independent MAC units simultaneously. In some embodiments where a MAC column has four MAC lanes for feeding activations or weights into the MAC column and each MAC lane may have a bandwidth of 16 bytes, the four MAC lanes can have a total loading bandwidth of 64 bytes.

Through the MAC lanes, each of at least a subset of the MAC units in the MAC array 380 may receive two signals: an input operand and a weight operand. The input operand may be a portion of an input tensor of a convolution, and the weight operand may be a portion of a filter of the convolution. In some embodiments, the input operand includes a vector in the input tensor, the vector may be a sequence of input elements having the same (X, Y) coordinates but different Z coordinate. The weight operand includes a vector including a sequence of weights having the same (X, Y) coordinates but different Z coordinate. The MAC unit may generate an output signal, which may be referred to as an output operand. The output operand may be a sequence of output elements having the same (X, Y) coordinates but different Z coordinate. The output operand may constitute a data block in a write transaction.

Example Memory Layouts

FIG. 4 illustrates a KCF memory layout of a set of weights, in accordance with various embodiments. For purpose of illustration, FIG. 4 shows a table that lists a sequence of memory addresses, each memory address includes 32 bytes (31-0). Each bytes stores a weight. In other embodiments, a memory address may include a different number of bytes. Also, a weight may need more than one byte. Each weight in the table is represented by three numbers: k, f, c, where k indicates the filter that includes the weight, f indicates the vector that includes the weight, and c indicates the channel of the weight. For purpose of simplicity, the weights in the table are from the same filter, and k=0 for all the weights. The filter includes 32 channels, so c is an integer between 0 and 31. Each channel includes 9 weights, so f is an integer between 0 and 8.

As shown in FIG. 4, the first address 0x000 starts with the nine weights in the first channel: (0,0,0)-(0,8,0), followed by the first weight in the second channel (0,0,1). After all the nine weights in the second channel (i.e., (0,0,1)-(0,8,1)), the third channel (i.e., (0,0,2)-(0,8,2)) is stored. This continues till the last channel (i.e., (0,0,31)-(0,8,31)) is stored. In the embodiments of FIG. 4, no sparse compression is performed so all the weights in the filter are included in the memory layout. In embodiments where there is more than one filter, the next filter may be stored right after the last weight (i.e., (0,8,31)) of the filter in the KCF order.

FIG. 5 illustrates a KFC memory layout of the set of weights in FIG. 4, in accordance with various embodiments. Also, the memory layout in FIG. 5 has the same amount of memory addresses as the memory layout in FIG. 4, and each memory address in FIG. 5 includes 31 bytes. As shown in FIG. 5, the first address 0x000 starts with the 32 weights in the first vector in the filter: i.e., (0,0,0)-(0,0,31), followed by the first weight in the second vector (0,1,0). After all the 32 weights in the second channel (i.e., (0,1,0)-(0,1,31)), the third vector (i.e., (0,2,0)-(0,2,31)) is stored. This continues till the last vector (i.e., (0,8,0)-(0,8,31)) is stored. In the embodiments of FIG. 5, no sparse compression is performed so all the weights in the filter are included in the memory layout. In embodiments where there is more than one filter, the next filter may be stored right after the last weight (i.e., (0,8,31)) of the filter in the KFC order.

FIG. 6 illustrates a KFC memory layout of a set of non-sparse weights, in accordance with various embodiments. The set of non-sparse weights may be from a single filter, which may be the same as the filter in FIG. 4 or 5. Sparse compression has been performed on the filter to remove sparse weights. Thus, the total number of weights in FIG. 6 is less than the total number of weights in FIG. 4 or 5. Accordingly, less memory storage space is needed. The memory layout in FIG. 4 or 5 includes addresses from 0x000 to 0x120, versus the memory layout in FIG. 6 includes addresses from 0x000 to 0x080.

The non-sparse weights are stored in a KFC order. The non-sparse weights in FIG. 6 are stored continuously. However, given that the numbers of non-sparse weights in different vectors can be different, the position of the first non-sparse weight in a vector may not be determined without knowing the number of non-sparse weights in preceding vectors. Buffering of all the non-sparse weights may be required for processing a vector (even the first vector).

FIG. 7 illustrates another KFC memory layout of the set of non-sparse weights in FIG. 6, in accordance with various embodiments. In FIG. 7, a fixed stride is set for the non-sparse weights. The fixed stride includes 32 bytes. Each vector is stored at a different address. As all the vectors have less than 32 non-sparse weights, the fixed stride is more than enough for all the vectors. As shown in FIG. 7, the first non-sparse weight of each vector is stored in the first byte of the corresponding address. The memory layout in FIG. 7 can therefore avoid the necessity of buffering all non-sparse weight of the filter. However, compared with the memory layout in FIG. 6, the memory layout in FIG. 7 requires a larger memory footprint. The memory layout in FIG. 7 requires addresses from 0x000 to 0x120, versus the memory layout in FIG. 6 requires addresses from 0x000 to 0x080. Many bytes in FIG. 7 are not used, which degrades the efficiency of memory usage. The memory efficiency may be better for larger filters that includes more weights.

FIG. 8 illustrates yet another KFC memory layout of the set of non-sparse weights in FIG. 6, in accordance with various embodiments. In FIG. 8, a smaller stride is used to reduce the memory footprint and improve the memory efficiency. The stride in FIG. 8 is 16 bytes (i.e., half word) and therefore, each address is used for two vectors. In some embodiments, the stride in FIG. 8 is determined based on the number of non-sparse weights in the least sparse vector, i.e., the vectors with f=0, 6, and 7. The other vectors include less non-sparse weights. Compared with the memory layout in FIG. 7 where each address is used for a single vector, the memory layout in FIG. 8 requires less addresses.

The determination of the stride based on the least sparse vector may be done by the compiler, which can make the compile time longer and can consume more computing resources. In some embodiments, the compiler may not be able to configure the stride. A stride may still be used in embodiments where the compiler fails to configure one. The stride is not dependent on the least sparse vector, and interleaving of weights from different vectors may be needed.

FIG. 9 illustrates a KFC memory layout where weights from different vectors are interleaved, in accordance with various embodiments. In FIG. 9, the weights are from a filter that includes 64 channels, so c is an integer between 0 and 63. Each channel includes 9 weights, so f is an integer between 0 and 8. Similar to FIG. 8, the memory layout in FIG. 9 has a stride of 16 bytes (i.e., half word). However, the stride size is less than the number of non-sparse weights in the least sparse vector, e.g., the vector with f=0, which has 28 non-sparse weights. Additionally, the vector with f=2 has 21 non-sparse weights. The vector with f=3 which has 19 non-sparse weights. The vector with f=6, which has 18 non-sparse weights. These four vectors cannot be stored with one stride.

As shown in FIG. 9, the memory layout starts with a sequence of nine memory sections, each of which corresponding to a different vector. The nine memory sections take the addresses 0x000 to 0x080 and the lower half-word in the address 0x0A0. The memory sections store the first 16 non-sparse weights of all the vectors. For the vectors with f=0, 2, 3,and 6, not all the non-sparse weights are stored in their memory sections in the sequence. For the other vectors that have no more than 16 non-sparse weights, all their non-sparse weights are stored in their memory sections in the sequence.

After the nine memory sections, the memory layout further includes a second sequence of seven memory sections for storing the extra non-sparse weights. The first memory section in the second sequence is the upper half-word in the address 0x0A0, which stores the extra non-sparse weights of the vector with f=0. The second memory section (i.e., the lower half-word in the address 0x0C0) is empty as the vector with f=1 does not have any extra non-sparse weights since all the non-sparse weights in the vector are stored in the first sequence. Similarly, the fifth and sixth memory sections in the second sequence are also empty. The third memory section (i.e., the upper half-word in the address 0x000) stores the extra non-sparse weights of the vector with f=2. The fourth memory section (i.e., the lower half-word in the address 0x0E0) stores the extra non-sparse weights of the vector with f=3. The seventh memory section (i.e., the upper half-word in the address 0x100) stores the extra non-sparse weights of the vector with f=6. As no other vectors have extra non-sparse weights, the second sequence ends at the seventh memory section. In embodiments where more vectors have extra non-sparse weights, the second sequence may include additional memory sections. Also, in embodiments where one or more vectors include more than 32 non-sparse weights, the memory layout may include a third sequence (or even more sequences) of memory section(s) to store non-sparse weights that cannot be stored in the preceding sequences.

Example MAC Array

Figure 10:
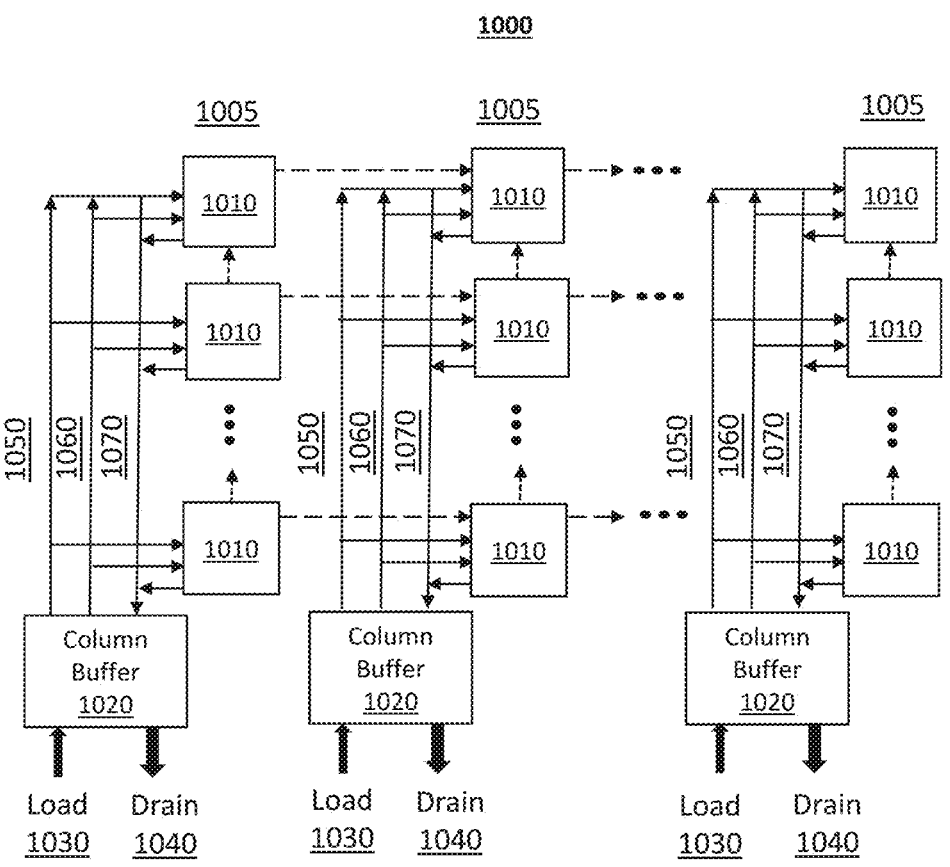
FIG. 10 illustrates an example MAC array, in accordance with various embodiments.

FIG. 10 illustrates an example MAC array 1000, in accordance with various embodiments. The MAC array 1000 is an embodiment of the MAC array 380 in FIG. 3. The MAC array 1000 includes a plurality of MAC units 1010 (individually referred to as "MAC unit 1010"). The MAC units 1010 perform MAC operations, such as integer MAC operations, floating-point MAC operations, and so on. The MAC units 1010 may also be referred to as neurons or nodes in the DNN. Each MAC unit 1010 has 2 input signals 1050 and 1060 and an output signal 1070. The input signal 1050 is at least a portion of an input tensor of a convolution. The input signal 1060 is at least a portion of a filter of the convolution. In some embodiments, the input signal 1050 of a MAC unit 1010 includes one or more input operands, and the input signal 1060 includes one or more weight operands.

Each MAC unit 1010 performs an MAC operation on the input signals 1050 and 1060 and outputs the output signal 1070, which is a result of the MAC operation. Some or all of the input signals 1050 and 1060 and the output signal 1070 may be in an integer format, such as INT8, or floating-point format, such as FP16 or BF16. For purpose of simplicity and illustration, the input signals and output signal of all the MAC units 1010 have the same reference numbers, but the MAC units 1010 may receive different input signals and output different output signals from each other. Also, a MAC unit 1010 may be different from another MAC unit 1010, e.g., including more, fewer, or different components.

As shown in FIG. 10, the MAC units 1010 are connected to each other, as indicated by the dash arrows in FIG. 10. The output signal 1070 of an MAC unit 1010 may be sent to many other MAC units 1010 (and possibly back to itself) as input signals via the interconnections between MAC units 1010. In some embodiments, the output signal 1070 of an MAC unit 1010 may incorporate the output signals of one or more other MAC units 1010 through an accumulate operation of the MAC unit 1010 and generates an internal partial sum of the MAC array. Certain aspects of the MAC units 1010 are described below in conjunction with FIG. 5.

In the embodiments of FIG. 10, the MAC units 1010 are arranged into columns 1005 (individually referred to as "column 1005" or "MAC column 1005"). The input and weights of the layer may be distributed to the MAC units 1010 based on the columns 1005. Each column 1005 has a column buffer 1020. The column buffer 1020 stores data provided to the MAC units 1010 in the column 1005 for a short amount of time. The column buffer 1020 may also store data output by the last MAC unit 1010 in the column 1005. The output of the last MAC unit 1010 may be a sum of the MAC operations of all the MAC units 1010 in the column 1005, which is a column-level internal partial sum of the MAC array 1000. In other embodiments, input and weights may be distributed to the MAC units 1010 based on rows in the MAC array 1000. The MAC array 1000 may include row buffers in lieu of column buffers 1020. A row buffer may store input signals of the MACs in the corresponding row and may also store a row-level internal partial sum of the MAC array 1000.

As shown in FIG. 10, each column buffer 1020 is associated with a load 1030 and a drain 1040. The data provided to the column 1005 is transmitted to the column buffer 1020 through the load 1030, e.g., through upper memory hierarchies, e.g., the memory 910 in FIG. 9. The data generated by the column 1005 is extracted from the column buffers 1020 through the drain 1040. In some embodiments, data extracted from a column buffer 1020 is sent to upper memory hierarchies, e.g., the memory 910 in FIG. 9, through the drain operation. In some embodiments, the drain operation does not start until all the MAC units 1010 in the column 1005 have finished their MAC operations. In some embodiments, the load 1030 or drain 1040 may be controlled by the DMA engine 920 in FIG. 9.

Example Method of Deep Learning

FIG. 11 is a flowchart showing a method 1100 of deep learning, in accordance with various embodiments. The method 1100 may be performed by the DMA engine 320 in FIG. 3. Although the method 1100 is described with reference to the flowchart illustrated in FIG. 11, many other methods for deep learning may alternatively be used. For example, the order of execution of the steps in FIG. 11 may be changed. As another example, some of the steps may be changed, eliminated, or combined.

The DMA engine 320 reads 1110 a filter for a convolution in a DNN from a first memory. The first memory may include a DRAM. The filter comprises a first number of channels. Each channel comprises a second number of weights. The filter is stored with a first memory layout that comprises the first number of first memory sections in a first sequence. A first memory section comprises the second number of consecutive bytes for storing weights in one of the channels.

The DMA engine 320 generates 1120 a second memory layout for storing at least a portion of the filter in a second memory. The second memory layout comprises the second number of second memory sections in a second sequence. A second memory section comprises a third number of consecutive bytes for storing weights from at least some of the first number of channels. Each consecutive byte is for a different channel. In some embodiments, each of the second memory section has the third number of consecutive bytes.

In some embodiments, the third number is smaller than the first number. In other embodiments, the third number is larger than the first number The third number may be determined by identifying a dense channel from the first number of channels, wherein the dense channel includes more non-zero valued weights than other one of the first number of channels and determining the third number based on a number of the non-zero valued weights in the dense channel. In some embodiments, the third number is a fixed number that is determined before reading the filter. The DMA engine 320 may remove one or more weight having zeroed values from the filter before generating the second memory layout. The removed weights may not be stored in the second memory.

In some embodiments, the second memory layout comprises a third sequence. The third sequence comprises the second number of third memory sections. A third memory section includes a fourth number of consecutive bytes for storing weights from at least some of the first number of channels. Each consecutive byte is for a different channel.

The DMA engine 320 generates 1130, based on the second memory layout, write transactions for writing at least the portion of the filter into the second memory. In some embodiments, the first memory is outside a compute block configured to perform multiply-accumulate operations on at least the portion of the filter, and the second memory is inside the compute block In some embodiments, the filter is a first filter of the convolution. The convolution has a second filter comprising a plurality of second weights. The DMA engine 320 may also read the second filter from the first memory. The plurality of weights is stored with a third memory layout where the plurality of second weights is in a third sequence. The DMA engine 320 may generate a fourth memory layout for storing at least a portion the second filter. At least some of the plurality of second weights are in a fourth sequence that is different from the third sequence. A first byte in the fourth sequence is after the last byte in the second sequence in the second memory. The DMA engine 320 may also generate, based on the fourth memory layout, write transactions for writing at least the portion of the second filter into the second memory.

Example Deep Learning Environment

Figure 12:
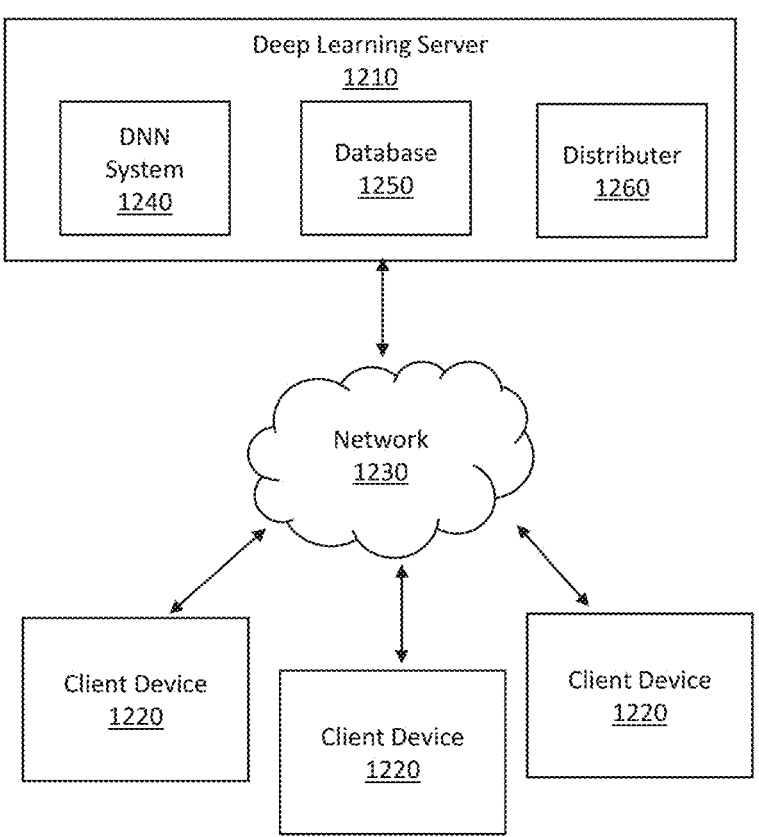
FIG. 12 illustrates a deep learning environment, in accordance with various embodiments.

FIG. 12 illustrates a deep learning environment 1200, in accordance with various embodiments. The deep learning environment 1200 includes a deep learning server 1210 and a plurality of client devices 1220 (individually referred to as client device 1220). The deep learning server 1210 is connected to the client devices 1220 through a network 1230. In other embodiments, the deep learning environment 1200 may include fewer, more, or different components.

The deep learning server 1210 trains deep learning models using neural networks. A neural network is structured like the human brain and consists of artificial neurons, also known as nodes. These nodes are stacked next to each other in 3 types of layers: input layer, hidden layer(s), and output layer. Data provides each node with information in the form of inputs. The node multiplies the inputs with random weights, calculates them, and adds a bias. Finally, nonlinear functions, also known as activation functions, are applied to determine which neuron to fire. The deep learning server 1210 can use various types of neural networks, such as DNN, recurrent neural network (RNN), generative adversarial network (GAN), long short-term memory network (LSTMN), and so on. During the process of training the deep learning models, the neural networks use unknown elements in the input distribution to extract features, group objects, and discover useful data patterns. The deep learning models can be used to solve various problems, e.g., making predictions, classifying images, and so on. The deep learning server 1210 may build deep learning models specific to particular types of problems that need to be solved. A deep learning model is trained to receive an input and outputs the solution to the particular problem.

In FIG. 12, the deep learning server 1210 includes a DNN system 1240, a database 1250, and a distributer 1260. The DNN system 1240 trains DNNs. The DNNs can be used to process images, e.g., images captured by autonomous vehicles, medical devices, satellites, and so on. In an embodiment, a DNN receives an input image and outputs classifications of objects in the input image. An example of the DNNs is the DNN 100 described above in conjunction with FIG. 1. In some embodiments, the DNN system 1240 trains DNNs through knowledge distillation, e.g., dense-connection based knowledge distillation. The trained DNNs may be used on low memory systems, like mobile phones, IOT edge devices, and so on. An embodiment of the DNN system 1240 is the DNN accelerator 200 described above in conjunction with FIG. 2.

The database 1250 stores data received, used, generated, or otherwise associated with the deep learning server 1210. For example, the database 1250 stores a training dataset that the DNN system 1240 uses to train DNNs. In an embodiment, the training dataset is an image gallery that can be used to train a DNN for classifying images. The training dataset may include data received from the client devices 1220. As another example, the database 1250 stores hyperparameters of the neural networks built by the deep learning server 1210.

The distributer 1260 distributes deep learning models generated by the deep learning server 1210 to the client devices 1220. In some embodiments, the distributer 1260 receives a request for a DNN from a client device 1220 through the network 1230. The request may include a description of a problem that the client device 1220 needs to solve. The request may also include information of the client device 1220, such as information describing available computing resource on the client device. The information describing available computing resource on the client device 1220 can be information indicating network bandwidth, information indicating available memory size, information indicating processing power of the client device 1220, and so on. In an embodiment, the distributer may instruct the DNN system 1240 to generate a DNN in accordance with the request. The DNN system 1240 may generate a DNN based on the information in the request. For instance, the DNN system 1240 can determine the structure of the DNN and/or train the DNN in accordance with the request.

In another embodiment, the distributer 1260 may select the DNN from a group of pre-existing DNNs based on the request. The distributer 1260 may select a DNN for a particular client device 1220 based on the size of the DNN and available resources of the client device 1220. In embodiments where the distributer 1260 determines that the client device 1220 has limited memory or processing power, the distributer 1260 may select a compressed DNN for the client device 1220, as opposed to an uncompressed DNN that has a larger size. The distributer 1260 then transmits the DNN generated or selected for the client device 1220 to the client device 1220.

In some embodiments, the distributer 1260 may receive feedback from the client device 1220. For example, the distributer 1260 receives new training data from the client device 1220 and may send the new training data to the DNN system 1240 for further training the DNN. As another example, the feedback includes an update of the available computing resource on the client device 1220. The distributer 1260 may send a different DNN to the client device 1220 based on the update. For instance, after receiving the feedback indicating that the computing resources of the client device 1220 have been reduced, the distributer 1260 sends a DNN of a smaller size to the client device 1220.

The client devices 1220 receive DNNs from the distributer 1260 and applies the DNNs to perform machine learning tasks, e.g., to solve problems or answer questions. In various embodiments, the client devices 1220 input images into the DNNs and use the output of the DNNs for various applications, e.g., visual reconstruction, augmented reality, robot localization and navigation, medical diagnosis, weather prediction, and so on. A client device 1220 may be one or more computing devices capable of receiving user input as well as transmitting and/or receiving data via the network 1230. In one embodiment, a client device 1220 is a conventional computer system, such as a desktop or a laptop computer. Alternatively, a client device 1220 may be a device having computer functionality, such as a personal digital assistant (PDA), a mobile telephone, a smartphone, an autonomous vehicle, or another suitable device. A client device 1220 is configured to communicate via the network 1230. In one embodiment, a client device 1220 executes an application allowing a user of the client device 1220 to interact with the deep learning server 1210 (e.g., the distributer 1260 of the deep learning server 1210). The client device 1220 may request DNNs or send feedback to the distributer 1260 through the application. For example, a client device 1220 executes a browser application to enable interaction between the client device 1220 and the deep learning server 1210 via the network 1230. In another embodiment, a client device 1220 interacts with the deep learning server 1210 through an application programming interface (API) running on a native operating system of the client device 1220, such as IOS® or ANDROID™.

In an embodiment, a client device 1220 is an integrated computing device that operates as a standalone network-enabled device. For example, the client device 1220 includes display, speakers, microphone, camera, and input device. In another embodiment, a client device 1220 is a computing device for coupling to an external media device such as a television or other external display and/or audio output system. In this embodiment, the client device 1220 may couple to the external media device via a wireless interface or wired interface (e.g., an HDMI (High-Definition Multimedia Interface) cable) and may utilize various functions of the external media device such as its display, speakers, microphone, camera, and input devices. Here, the client device 1220 may be configured to be compatible with a generic external media device that does not have specialized software, firmware, or hardware specifically for interacting with the client device 1220.

The network 1230 supports communications between the deep learning server 1210 and client devices 1220. The network 1230 may comprise any combination of local area and/or wide area networks, using both wired and/or wireless communication systems. In one embodiment, the network 1230 may use standard communications technologies and/or protocols. For example, the network 1230 may include communication links using technologies such as Ethernet, 12010.11, worldwide interoperability for microwave access (WiMAX), 3G, 4G, code division multiple access (CDMA), digital subscriber line (DSL), etc. Examples of networking protocols used for communicating via the network 1230 may include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 1230 may be represented using any suitable format, such as hypertext markup language (HTML) or extensible markup language (XML). In some embodiments, all or some of the communication links of the network 1230 may be encrypted using any suitable technique or techniques.

Example DNN System

Figure 13:
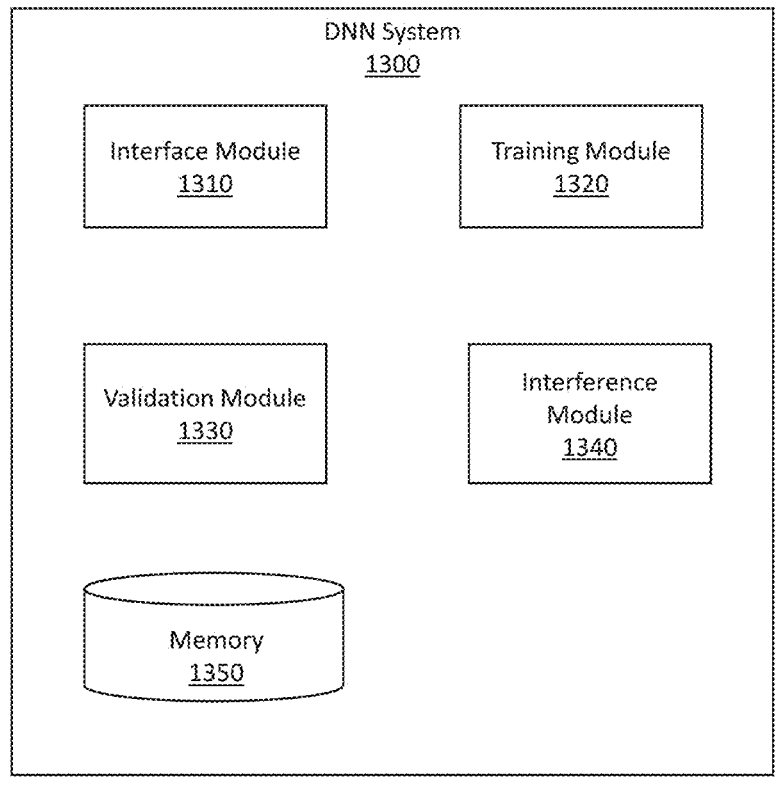
FIG. 13 is a block diagram of an example DNN system, in accordance with various embodiments.

FIG. 13 is a block diagram of an example DNN system 1300, in accordance with various embodiments. The whole DNN system 1300 or a part of the DNN system 1300 may be implemented in the computing device 1400 in FIG. 14. The DNN system 1300 trains DNNs for various tasks, such as image classification, learning relationships between biological cells (e.g., DNA, proteins, etc.), control behaviors for devices (e.g., robots, machines, etc.), and so on. The DNN system 1300 includes an interface module 1310, a training module 1320, a validation module 1330, an inference module 1340, and a memory 1350. In other embodiments, alternative configurations, different or additional components may be included in the DNN system 1300. Further, functionality attributed to a component of the DNN system 1300 may be accomplished by a different component included in the DNN system 1300 or a different system. The DNN system 1300 or a component of the DNN system 1300 (e.g., the training module 1320 or inference module 1340) may include the computing device 1400.

The interface module 1310 facilitates communications of the DNN system 1300 with other systems. For example, the interface module 1310 establishes communications between the DNN system 1300 with an external database to receive data that can be used to train DNNs or input into DNNs to perform tasks. As another example, the interface module 1310 supports the DNN system 1300 to distribute DNNs to other systems, e.g., computing devices configured to apply DNNs to perform tasks.

The training module 1320 trains DNNs by using a training dataset. The training module 1320 forms the training dataset. In an embodiment where the training module 1320 trains an DNN to recognize objects in images, the training dataset includes training images and training labels. The training labels describe ground-truth classifications of objects in the training images. In some embodiments, each label in the training dataset corresponds to an object in a training image. In some embodiments, a part of the training dataset may be used to initially train the DNN, and the rest of the training dataset may be held back as a validation subset used by the validation module 1330 to validate performance of a trained DNN. The portion of the training dataset not including the tuning subset and the validation subset may be used to train the DNN.

The training module 1320 also determines hyperparameters for training the DNN. Hyperparameters are variables specifying the DNN training process. Hyperparameters are different from parameters inside the DNN (e.g., weights of filters). In some embodiments, hyperparameters include variables determining the architecture of the DNN, such as number of hidden layers, etc. Hyperparameters also include variables which determine how the DNN is trained, such as batch size, number of epochs, etc. A batch size defines the number of training samples to work through before updating the parameters of the DNN. The batch size is the same as or smaller than the number of samples in the training dataset. The training dataset can be divided into one or more batches. The number of epochs defines how many times the entire training dataset is passed forward and backwards through the entire network. The number of epochs defines the number of times that the deep learning algorithm works through the entire training dataset. One epoch means that each training sample in the training dataset has had an opportunity to update the parameters inside the DNN. An epoch may include one or more batches. The number of epochs may be 13, 130, 500, 1300, or even larger.

The training module 1320 defines the architecture of the DNN, e.g., based on some of the hyperparameters. The architecture of the DNN includes an input layer, an output layer, and a plurality of hidden layers. The input layer of an DNN may include tensors (e.g., a multidimensional array) specifying attributes of the input image, such as the height of the input image, the width of the input image, and the depth of the input image (e.g., the number of bits specifying the color of a pixel in the input image). The output layer includes labels of objects in the input layer. The hidden layers are layers between the input layer and output layer. The hidden layers include one or more convolutional layers and one or more other types of layers, such as pooling layers, fully connected layers, normalization layers, softmax or logistic layers, and so on. The convolutional layers of the DNN abstract the input image to a feature map that is represented by a tensor specifying the feature map height, the feature map width, and the feature map channels (e.g., red, green, blue images include 3 channels). A pooling layer is used to reduce the spatial volume of input image after convolution. It is used between 2 convolution layers. A fully connected layer involves weights, biases, and neurons. It connects neurons in one layer to neurons in another layer. It is used to classify images between different category by training.

In the process of defining the architecture of the DNN, the training module 1320 also adds an activation function to a hidden layer or the output layer. An activation function of a layer transforms the weighted sum of the input of the layer to an output of the layer. The activation function may be, for example, a rectified linear unit activation function, a tangent activation function, or other types of activation functions.

After the training module 1320 defines the architecture of the DNN, the training module 1320 inputs a training dataset into the DNN. The training dataset includes a plurality of training samples. An example of a training sample includes an object in an image and a ground-truth label of the object. The training module 1320 modifies the parameters inside the DNN ("internal parameters of the DNN") to minimize the error between labels of the training objects that are generated by the DNN and the ground-truth labels of the objects. The internal parameters include weights of filters in the convolutional layers of the DNN. In some embodiments, the training module 1320 uses a cost function to minimize the error.

The training module 1320 may train the DNN for a predetermined number of epochs. The number of epochs is a hyperparameter that defines the number of times that the deep learning algorithm will work through the entire training dataset. One epoch means that each sample in the training dataset has had an opportunity to update internal parameters of the DNN. After the training module 1320 finishes the predetermined number of epochs, the training module 1320 may stop updating the parameters in the DNN. The DNN having the updated parameters is referred to as a trained DNN.

The validation module 1330 verifies accuracy of trained DNNs. In some embodiments, the validation module 1330 inputs samples in a validation dataset into a trained DNN and uses the outputs of the DNN to determine the model accuracy. In some embodiments, a validation dataset may be formed of some or all the samples in the training dataset. Additionally or alternatively, the validation dataset includes additional samples, other than those in the training sets. In some embodiments, the validation module 1330 may determine an accuracy score measuring the precision, recall, or a combination of precision and recall of the DNN. The validation module 1330 may use the following metrics to determine the accuracy score: Precision=TP/(TP+FP) and Recall=TP/(TP+FN), where precision may be how many the reference classification model correctly predicted (TP or true positives) out of the total it predicted (TP+FP or false positives), and recall may be how many the reference classification model correctly predicted (TP) out of the total number of objects that did have the property in question (TP+FN or false negatives). The F-score (F-score=2*PR/(P+R)) unifies precision and recall into a single measure.

The validation module 1330 may compare the accuracy score with a threshold score. In an example where the validation module 1330 determines that the accuracy score of the augmented model is lower than the threshold score, the validation module 1330 instructs the training module 1320 to re-train the DNN. In one embodiment, the training module 1320 may iteratively re-train the DNN until the occurrence of a stopping condition, such as the accuracy measurement indication that the DNN may be sufficiently accurate, or a number of training rounds having taken place.

The inference module 1340 applies the trained or validated DNN to perform tasks. For instance, the inference module 1340 inputs images into the DNN. The DNN outputs classifications of objects in the images. As an example, the DNN may be provisioned in a security setting to detect malicious or hazardous objects in images captured by security cameras. As another example, the DNN may be provisioned to detect objects (e.g., road signs, hazards, humans, pets, etc.) in images captured by cameras of an autonomous vehicle. The input to the DNN may be formatted according to a predefined input structure mirroring the way that the training dataset was provided to the DNN. The DNN may generate an output structure which may be, for example, a classification of the image, a listing of detected objects, a boundary of detected objects, or the like. In some embodiments, the inference module 1340 distributes the DNN to other systems, e.g., computing devices in communication with the DNN system 1300, for the other systems to apply the DNN to perform the tasks.

The memory 1350 stores data received, generated, used, or otherwise associated with the DNN system 1300. For example, the memory 1350 stores the datasets used by the training module 1320 and validation module 1330. The memory 1350 may also store data generated by the training module 1320 and validation module 1330, such as the hyperparameters for training DNNs, internal parameters of trained DNNs (e.g., values of tunable parameters of activation functions, such as Fractional Adaptive Linear Units (FALUs)), etc. In the embodiment of FIG. 13, the memory 1350 is a component of the DNN system 1300. In other embodiments, the memory 1350 may be external to the DNN system 1300 and communicate with the DNN system 1300 through a network.

Example Computing Device

Figure 14:
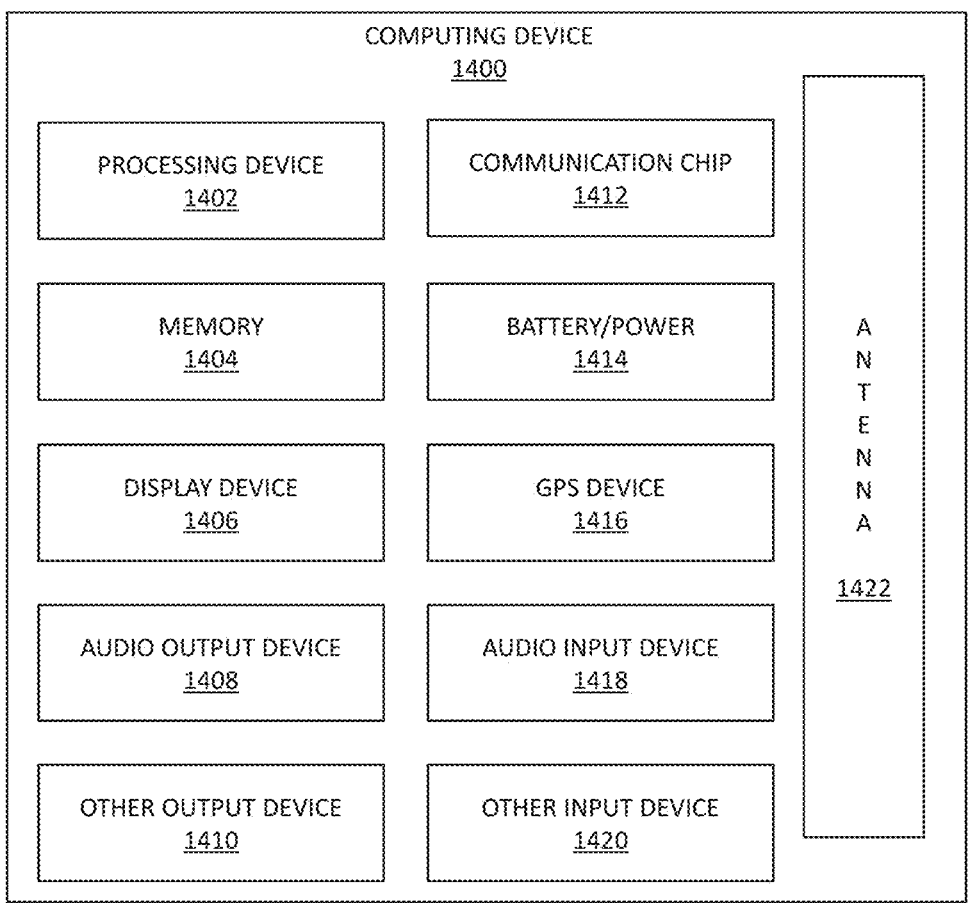
FIG. 14 is a block diagram of an example computing device, in accordance with various embodiments.

FIG. 14 is a block diagram of an example computing device 1400, in accordance with various embodiments. In some embodiments, the computing device 1400 can be used as the DNN system 1300 in FIG. 13. A number of components are illustrated in FIG. 14 as included in the computing device 1400, but any one or more of these components may be omitted or duplicated, as suitable for the application. In some embodiments, some or all of the components included in the computing device 1400 may be attached to one or more motherboards. In some embodiments, some or all of these components are fabricated onto a single system on a chip (SoC) die. Additionally, in various embodiments, the computing device 1400 may not include one or more of the components illustrated in FIG. 14, but the computing device 1400 may include interface circuitry for coupling to the one or more components. For example, the computing device 1400 may not include a display device 1406, but may include display device interface circuitry (e.g., a connector and driver circuitry) to which a display device 1406 may be coupled. In another set of examples, the computing device 1400 may not include an audio input device 1418 or an audio output device 1408, but may include audio input or output device interface circuitry (e.g., connectors and supporting circuitry) to which an audio input device 1418 or audio output device 1408 may be coupled.

The computing device 1400 may include a processing device 1402 (e.g., one or more processing devices). The processing device 1402 processes electronic data from registers and/or memory to transform that electronic data into other electronic data that may be stored in registers and/or memory. The computing device 1400 may include a memory 1404, which may itself include one or more memory devices such as volatile memory (e.g., DRAM), nonvolatile memory (e.g., read-only memory (ROM)), high bandwidth memory (HBM), flash memory, solid state memory, and/or a hard drive. In some embodiments, the memory 1404 may include memory that shares a die with the processing device 1402. In some embodiments, the memory 1404 includes one or more non-transitory computer-readable media storing instructions executable to perform operations for deep learning, e.g., the method 1100 described above in conjunction with FIG. 11 or some operations performed by the DNN accelerator 310 described above in conjunction with FIG. 3 (e.g., operations performed by the DMA engine 320). The instructions stored in the one or more non-transitory computer-readable media may be executed by the processing device 2402.

In some embodiments, the computing device 1400 may include a communication chip 1412 (e.g., one or more communication chips). For example, the communication chip 1412 may be configured for managing wireless communications for the transfer of data to and from the computing device 1400. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1412 may implement any of a number of wireless standards or protocols, including but not limited to Institute for Electrical and Electronic Engineers (IEEE) standards including Wi-Fi (IEEE 802.10 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for worldwide interoperability for microwave access, which is a certification mark for products that pass conformity and interoperability tests for the IEEE 802.16 standards. The communication chip 1412 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1412 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1412 may operate in accordance with CDMA, Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1412 may operate in accordance with other wireless protocols in other embodiments. The computing device 1400 may include an antenna 1422 to facilitate wireless communications and/or to receive other wireless communications (such as AM or FM radio transmissions).

In some embodiments, the communication chip 1412 may manage wired communications, such as electrical, optical, or any other suitable communication protocols (e.g., the Ethernet). As noted above, the communication chip 1412 may include multiple communication chips. For instance, a first communication chip 1412 may be dedicated to shorter-range wireless communications such as Wi-Fi or Bluetooth, and a second communication chip 1412 may be dedicated to longer-range wireless communications such as global positioning system (GPS), EDGE, GPRS, CDMA, WiMAX, LTE, EV-DO, or others. In some embodiments, a first communication chip 1412 may be dedicated to wireless communications, and a second communication chip 1412 may be dedicated to wired communications.

The computing device 1400 may include battery/power circuitry 1414. The battery/power circuitry 1414 may include one or more energy storage devices (e.g., batteries or capacitors) and/or circuitry for coupling components of the computing device 1400 to an energy source separate from the computing device 1400 (e.g., AC line power).

The computing device 1400 may include a display device 1406 (or corresponding interface circuitry, as discussed above). The display device 1406 may include any visual indicators, such as a heads-up display, a computer monitor, a projector, a touchscreen display, a liquid crystal display (LCD), a light-emitting diode display, or a flat panel display, for example.

The computing device 1400 may include an audio output device 1408 (or corresponding interface circuitry, as discussed above). The audio output device 1408 may include any device that generates an audible indicator, such as speakers, headsets, or earbuds, for example.

The computing device 1400 may include an audio input device 1418 (or corresponding interface circuitry, as discussed above). The audio input device 1418 may include any device that generates a signal representative of a sound, such as microphones, microphone arrays, or digital instruments (e.g., instruments having a musical instrument digital interface (MIDI) output).

The computing device 1400 may include a GPS device 1416 (or corresponding interface circuitry, as discussed above). The GPS device 1416 may be in communication with a satellite-based system and may receive a location of the computing device 1400, as known in the art.

The computing device 1400 may include another output device 1410 (or corresponding interface circuitry, as discussed above). Examples of the other output device 1410 may include an audio codec, a video codec, a printer, a wired or wireless transmitter for providing information to other devices, or an additional storage device.

The computing device 1400 may include another input device 1420 (or corresponding interface circuitry, as discussed above). Examples of the other input device 1420 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 1400 may have any desired form factor, such as a handheld or mobile computer system (e.g., a cell phone, a smart phone, a mobile internet device, a music player, a tablet computer, a laptop computer, a netbook computer, an ultrabook computer, a PDA, an ultramobile personal computer, etc.), a desktop computer system, a server or other networked computing component, a printer, a scanner, a monitor, a set-top box, an entertainment control unit, a vehicle control unit, a digital camera, a digital video recorder, or a wearable computer system. In some embodiments, the computing device 1400 may be any other electronic device that processes data.

Select Examples

The following paragraphs provide various examples of the embodiments disclosed herein.

Example 1 provides a method of deep learning, the method including reading a filter for a convolution in a DNN from a first memory, where the filter includes a first number of channels, each channel includes a second number of weights, the filter is stored with a first memory layout that includes the first number of first memory sections in a first sequence, and a first memory section includes the second number of consecutive bytes for storing weights in one of the channels; generating a second memory layout for storing at least a portion of the filter in a second memory, where the second memory layout includes the second number of second memory sections in a second sequence, a second memory section includes a third number of consecutive bytes for storing weights from at least some of the first number of channels, and each consecutive byte is for a different channel; and generating, based on the second memory layout, write transactions for writing at least the portion of the filter into the second memory.

Example 2 provides the method of example 1, where the third number is smaller than the first number.

Example 3 provides the method of example 2, further including removing one or more weight having zeroed values from the filter before generating the second memory layout.

Example 4 provides the method of any of the preceding examples, where each of the second memory section has the third number of consecutive bytes.

Example 5 provides the method of example 4, where the third number is determining by identifying a dense channel from the first number of channels, where the dense channel includes more non-zero valued weights than other one of the first number of channels; and determining the third number based on a number of the non-zero valued weights in the dense channel.

Example 6 provides the method of example 4 or 5, where the third number is a fixed number that is determined before reading the filter.

Example 7 provides the method of any of the preceding examples, where the second memory layout includes a third sequence, the third sequence includes the second number of third memory sections, a third memory section includes a fourth number of consecutive bytes for storing weights from at least some of the first number of channels, and each consecutive byte is for a different channel.

Example 8 provides the method of any of the preceding examples, where the third number is larger than the first number.

Example 9 provides the method of any of the preceding examples, where the first memory is outside a compute block configured to perform multiply-accumulate operations on at least the portion of the filter, and the second memory is inside the compute block.

Example 10 provides the method of any of the preceding examples, where the filter is a first filter of the convolution, the convolution has a second filter including a plurality of second weights, and the method further includes reading the second filter from the first memory, where the plurality of weights is stored with a third memory layout where the plurality of second weights is in a third sequence, generating a fourth memory layout for storing at least a portion the second filter, where at least some of the plurality of second weights are in a fourth sequence that is different from the third sequence, and a first byte in the fourth sequence is after the last byte in the second sequence in the second memory, and generating, based on the fourth memory layout, write transactions for writing at least the portion of the second filter into the second memory.

Example 11 provides one or more non-transitory computer-readable media storing instructions executable to perform operations for deep learning, the operations including reading a filter for a convolution in a DNN from a first memory, where the filter includes a first number of channels, each channel includes a second number of weights, the filter is stored with a first memory layout that includes the first number of first memory sections in a first sequence, and a first memory section includes the second number of consecutive bytes for storing weights in one of the channels; generating a second memory layout for storing at least a portion of the filter in a second memory, where the second memory layout includes the second number of second memory sections in a second sequence, a second memory section includes a third number of consecutive bytes for storing weights from at least some of the first number of channels, and each consecutive byte is for a different channel; and generating, based on the second memory layout, write transactions for writing at least the portion of the filter into the second memory.

Example 12 provides the one or more non-transitory computer-readable media of example 11, where the third number is smaller than the first number.

Example 13 provides the one or more non-transitory computer-readable media of example 12, where the operations further include removing one or more weight having zeroed values from the filter before generating the second memory layout.

Example 14 provides the one or more non-transitory computer-readable media of any one of examples 11-13, where each of the second memory section has the third number of consecutive bytes.

Example 15 provides the one or more non-transitory computer-readable media of example 14, where the third number is determining by identifying a dense channel from the first number of channels, where the dense channel includes more non-zero valued weights than other one of the first number of channels; and determining the third number based on a number of the non-zero valued weights in the dense channel.

Example 16 provides the one or more non-transitory computer-readable media of example 14 or 15, where the third number is a fixed number that is determined before reading the filter.

Example 17 provides the one or more non-transitory computer-readable media of any one of examples 11-16, where the second memory layout includes a third sequence, the third sequence includes the second number of third memory sections, a third memory section includes a fourth number of consecutive bytes for storing weights from at least some of the first number of channels, and each consecutive byte is for a different channel.

Example 18 provides the one or more non-transitory computer-readable media of any one of examples 11-17, where the third number is larger than the first number.

Example 19 provides the one or more non-transitory computer-readable media of any one of examples 11-18, where the first memory is outside a compute block configured to perform multiply-accumulate operations on at least the portion of the filter, and the second memory is inside the compute block.

Example 20 provides the one or more non-transitory computer-readable media of any one of examples 11-19, where the filter is a first filter of the convolution, the convolution has a second filter including a plurality of second weights, and the operations further include reading the second filter from the first memory, where the plurality of weights is stored with a third memory layout where the plurality of second weights is in a third sequence, generating a fourth memory layout for storing at least a portion the second filter, where at least some of the plurality of second weights are in a fourth sequence that is different from the third sequence, and a first byte in the fourth sequence is after the last byte in the second sequence in the second memory, and generating, based on the fourth memory layout, write transactions for writing at least the portion of the second filter into the second memory.

Example 21 provides a DNN accelerator, the DNN accelerator including a first memory; a compute block, including an array of multiple-accumulate (MAC) units configured to run MAC operations in a DNN, and a second memory; and a DMA engine configured to read a filter for a convolution in the DNN from the first memory, where the filter includes a first number of channels, each channel includes a second number of weights, the filter is stored with a first memory layout that includes the first number of first memory sections in a first sequence, and a first memory section includes the second number of consecutive bytes for storing weights in one of the channels, generate a second memory layout for storing at least a portion of the filter in the second memory, where the second memory layout includes the second number of second memory sections in a second sequence, a second memory section includes a third number of consecutive bytes for storing weights from at least some of the first number of channels, and each consecutive byte is for a different channel, and generate, based on the second memory layout, write transactions for writing at least the portion of the filter into the second memory.

Example 22 provides the DNN accelerator of example 21, where each of the second memory section has the third number of consecutive bytes.

Example 23 provides the DNN accelerator of example 22, where the third number is determining by identifying a dense channel from the first number of channels, where the dense channel includes more non-zero valued weights than other one of the first number of channels; and determining the third number based on a number of the non-zero valued weights in the dense channel.

Example 24 provides the DNN accelerator of any one of examples 21-23, where the second memory layout includes a third sequence, the third sequence includes the second number of third memory sections, a third memory section includes a fourth number of consecutive bytes for storing weights from at least some of the first number of channels, and each consecutive byte is for a different channel.

Example 25 provides the DNN accelerator of any one of examples 21-24, where the filter is a first filter of the convolution, the convolution has a second filter including a plurality of second weights, and the DMA engine is further configured to read the second filter from the first memory, where the plurality of weights is stored with a third memory layout where the plurality of second weights is in a third sequence, generate a fourth memory layout for storing at least a portion the second filter, where at least some of the plurality of second weights are in a fourth sequence that is different from the third sequence, and a first byte in the fourth sequence is after the last byte in the second sequence in the second memory, and generate, based on the fourth memory layout, write transactions for writing at least the portion of the second filter into the second memory.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

The invention claimed is:

1. A method of deep learning, the method comprising:
reading a filter for a convolution in a deep neural network (DNN) from a first memory, wherein the filter comprises a first number of channels, each channel comprises a second number of weights, the filter is stored with a first memory layout that comprises the first number of first memory sections in a first sequence, and a first memory section comprises the second number of consecutive bytes for storing weights in one of the channels;

generating a second memory layout for storing at least a portion of the filter in a second memory, wherein the second memory layout comprises the second number of second memory sections in a second sequence, a second memory section comprises a third number of consecutive bytes for storing weights from at least some of the first number of channels, and each consecutive byte is for a different channel; and generating, based on the second memory layout, write transactions for writing at least the portion of the filter into the second memory.

2. The method of claim 1, wherein the third number is smaller than the first number.

3. The method of claim 2, further comprising:

removing one or more weight having zeroed values from the filter before generating the second memory layout.

4. The method of claim 1, wherein each of the second memory section has the third number of consecutive bytes.

5. The method of claim 4, wherein the third number is determining by:

identifying a dense channel from the first number of channels, wherein the dense channel includes more non-zero valued weights than other one of the first number of channels; and determining the third number based on a number of the non-zero valued weights in the dense channel.

6. The method of claim 4, wherein the third number is a fixed number that is determined before reading the filter.

7. The method of claim 1, wherein the second memory layout comprises a third sequence, the third sequence comprises the second number of third memory sections, a third memory section includes a fourth number of consecutive bytes for storing weights from at least some of the first number of channels, and each consecutive byte is for a different channel.

8. The method of claim 1, wherein the third number is larger than the first number.

9. The method of claim 1, wherein the first memory is outside a compute block configured to perform multiply-accumulate operations on at least the portion of the filter, and the second memory is inside the compute block.

10. The method of claim 1, wherein the filter is a first filter of the convolution, the convolution has a second filter comprising a plurality of second weights, and the method further comprises:

reading the second filter from the first memory, wherein the plurality of weights is stored with a third memory layout where the plurality of second weights is in a third sequence, generating a fourth memory layout for storing at least a portion of the second filter, wherein at least some of the plurality of second weights are in a fourth sequence that is different from the third sequence, and a first byte in the fourth sequence is after the last byte in the second sequence in the second memory, and generating, based on the fourth memory layout, write transactions for writing at least the portion of the second filter into the second memory.

11. One or more non-transitory computer-readable media storing instructions executable to perform operations for deep learning, the operations comprising:

reading a filter for a convolution in a deep neural network (DNN) from a first memory, wherein the filter comprises a first number of channels, each channel comprises a second number of weights, the filter is stored with a first memory layout that comprises the first number of first memory sections in a first sequence, and a first memory section comprises the second number of consecutive bytes for storing weights in one of the channels;

generating a second memory layout for storing at least a portion of the filter in a second memory, wherein the second memory layout comprises the second number of second memory sections in a second sequence, a second memory section comprises a third number of consecutive bytes for storing weights from at least some of the first number of channels, and each consecutive byte is for a different channel; and generating, based on the second memory layout, write transactions for writing at least the portion of the filter into the second memory.

12. The one or more non-transitory computer-readable media of claim 11, wherein the third number is smaller than the first number.

13. The one or more non-transitory computer-readable media of claim 12, wherein the operations further comprise:

removing one or more weight having zeroed values from the filter before generating the second memory layout.

14. The one or more non-transitory computer-readable media of claim 11, wherein each of the second memory section has the third number of consecutive bytes.

15. The one or more non-transitory computer-readable media of claim 14, wherein the third number is determining by:

identifying a dense channel from the first number of channels, wherein the dense channel includes more non-zero valued weights than other one of the first number of channels; and determining the third number based on a number of the non-zero valued weights in the dense channel.

16. The one or more non-transitory computer-readable media of claim 14, wherein the third number is a fixed number that is determined before reading the filter.

17. The one or more non-transitory computer-readable media of claim 11, wherein the second memory layout comprises a third sequence, the third sequence comprises the second number of third memory sections, a third memory section includes a fourth number of consecutive bytes for storing weights from at least some of the first number of channels, and each consecutive byte is for a different channel.

18. The one or more non-transitory computer-readable media of claim 11, wherein the third number is larger than the first number.

19. The one or more non-transitory computer-readable media of claim 11, wherein the first memory is outside a compute block configured to perform multiply-accumulate operations on at least the portion of the filter, and the second memory is inside the compute block.

20. The one or more non-transitory computer-readable media of claim 11, wherein the filter is a first filter of the convolution, the convolution has a second filter comprising a plurality of second weights, and the operations further comprise:

reading the second filter from the first memory, wherein the plurality of weights is stored with a third memory layout where the plurality of second weights is in a third sequence, generating a fourth memory layout for storing at least a portion the second filter, wherein at least some of the plurality of second weights are in a fourth sequence that is different from the third sequence, and a first byte in the fourth sequence is after the last byte in the second sequence in the second memory, and generating, based on the fourth memory layout, write transactions for writing at least the portion of the second filter into the second memory.

21. A deep neural network (DNN) accelerator, the DNN accelerator comprising:

a first memory;

a compute block, comprising:

an array of multiple-accumulate (MAC) units configured to run MAC operations in a deep neural network (DNN), and a second memory; and a direct memory access (DMA) engine configured to:

read a filter for a convolution in the DNN from the first memory, wherein the filter comprises a first number of channels, each channel comprises a second number of weights, the filter is stored with a first memory layout that comprises the first number of first memory sections in a first sequence, and a first memory section comprises the second number of consecutive bytes for storing weights in one of the channels, generate a second memory layout for storing at least a portion of the filter in the second memory, wherein the second memory layout comprises the second number of second memory sections in a second sequence, a second memory section comprises a third number of consecutive bytes for storing weights from at least some of the first number of channels, and each consecutive byte is for a different channel, and generate, based on the second memory layout, write transactions for writing at least the portion of the filter into the second memory.

22. The DNN accelerator of claim 21, wherein each of the second memory section has the third number of consecutive bytes.

23. The DNN accelerator of claim 22, wherein the third number is determining by:

identifying a dense channel from the first number of channels, wherein the dense channel includes more non-zero valued weights than other one of the first number of channels; and determining the third number based on a number of the non-zero valued weights in the dense channel.

24. The DNN accelerator of claim 21, wherein the second memory layout comprises a third sequence, the third sequence comprises the second number of third memory sections, a third memory section includes a fourth number of consecutive bytes for storing weights from at least some of the first number of channels, and each consecutive byte is for a different channel.

25. The DNN accelerator of claim 21, wherein the filter is a first filter of the convolution, the convolution has a second filter comprising a plurality of second weights, and the DMA engine is further configured to:

read the second filter from the first memory, wherein the plurality of weights is stored with a third memory layout where the plurality of second weights is in a third sequence, generate a fourth memory layout for storing at least a portion the second filter, wherein at least some of the plurality of second weights are in a fourth sequence that is different from the third sequence, and a first byte in the fourth sequence is after the last byte in the second sequence in the second memory, and generate, based on the fourth memory layout, write transactions for writing at least the portion of the second filter into the second memory.

* * * * *